US012589394B2

(12) United States Patent
Clime et al.

(10) Patent No.: US 12,589,394 B2
(45) Date of Patent: Mar. 31, 2026

(54) WORLD-TO-CHIP AUTOMATED INTERFACE FOR CENTRIFUGAL MICROFLUIDIC PLATFORMS

(71) Applicant: National Research Council of Canada, Ottawa (CA)

(72) Inventors: Liviu Clime, Longueuil (CA); Keith Morton, St-Bruno (CA); Daniel Brassard, Longueuil (CA); Mathias Geissler, Boucherville (CA); Jamal Daoud, Montreal (CA); Harold Hebert, Longueuil (CA); Teodor Veres, Montreal (CA)

(73) Assignee: A. National Research Council of Canada, Ottawa (CA)

( * ) Notice: Subject to any disclaimer, the term of this patent is extended or adjusted under 35 U.S.C. 154(b) by 1226 days.

(21) Appl. No.: 17/292,669

(22) PCT Filed: Nov. 12, 2019

(86) PCT No.: PCT/IB2019/059715

§ 371 (c)(1),
(2) Date: May 10, 2021

(87) PCT Pub. No.: WO2020/100039

PCT Pub. Date: May 22, 2020

(65) Prior Publication Data

US 2022/0008924 A1 Jan. 13, 2022

Related U.S. Application Data

(60) Provisional application No. 62/760,256, filed on Nov. 13, 2018.

(51) Int. Cl.
*B01L 3/00* (2006.01)

(52) U.S. Cl.
CPC ... *B01L 3/502753* (2013.01); *B01L 3/502707* (2013.01); *B01L 2300/069* (2013.01);
(Continued)

(58) Field of Classification Search
CPC ....... G01N 35/00069; G01N 35/00029; G01N 35/1002; G01N 2035/00495;
(Continued)

(56) References Cited

U.S. PATENT DOCUMENTS 4,776,832 A 10/1988 Martin et al.
6,030,581 A 2/2000 Virtanen
(Continued)

FOREIGN PATENT DOCUMENTS

DE 202011108189 2/2012
DE 102012220250 A1 5/2014
(Continued)

OTHER PUBLICATIONS

Daniel Brassard, Liviu Clime, Mathias Geissler and Teodor Veres, Combining Active Pneumatic Pumping and Centrifugal Forces: A New Paradigm for the Integration of Bioanyalytical Assays, 19th International Conference on Miniaturized System for Chemistry and Life Sciences, Oct. 2015, 191-193.
(Continued)

*Primary Examiner* — Shogo Sasaki
(74) *Attorney, Agent, or Firm* — Jason E. J. Davis

(57) ABSTRACT

A centrifugal microfluidic platform is combined with a stationary liquid pumping system which pumps liquids into microfluidic chips by dripping through a stationary dispensing nozzle without any physical contact or coupling between the nozzles and the microfluidic chips.

16 Claims, 28 Drawing Sheets

(52) U.S. Cl.

CPC . *B01L 2300/126* (2013.01); *B01L 2400/0409* (2013.01); *B01L 2400/0478* (2013.01)

(58) Field of Classification Search

CPC ......... B01L 3/502753; B01L 3/502715; B01L 2300/069; B01L 2200/0621; B01L 2300/126; B01L 2400/0487; B01L 2300/0816; B01L 2300/0864; B01L 2300/0803; B01L 2400/0409; B01L 2400/0478

See application file for complete search history.

(56) References Cited

U.S. PATENT DOCUMENTS

| | | | | | |
|---|---|---|---|---|---|
| 6,063,589 | A * | 5/2000 | Kellogg | H01R 39/64 | 422/50 |
| 6,706,519 | B1 * | 3/2004 | Kellogg | B01F 35/712 | 435/288.5 |
| 7,147,362 | B2 | 12/2006 | Caren et al. | | |
| 7,332,326 | B1 * | 2/2008 | Kellogg | G01N 35/00069 | 422/54 |
| 7,384,602 | B2 | 6/2008 | Nagaoka et al. | | |
| 7,635,585 | B2 | 12/2009 | Yoo | | |
| 8,303,911 | B2 | 11/2012 | Siegrist et al. | | |
| 8,444,934 | B2 | 5/2013 | Peytavi | | |
| 8,931,331 | B2 | 1/2015 | Ludowise et al. | | |
| 9,651,460 | B2 | 5/2017 | Albuquerque et al. | | |
| 12,030,046 | B2 * | 7/2024 | Hosseini | C12Q 1/6888 | |
| 12,285,759 | B2 * | 4/2025 | Seo | G01N 35/00069 | |
| 2002/0048535 | A1 * | 4/2002 | Weigl | B01F 25/4331 | 436/180 |
| 2002/0076354 | A1 * | 6/2002 | Cohen | B01L 3/502753 | 435/7.9 |
| 2002/0097632 | A1 * | 7/2002 | Kellogg | B01L 3/502715 | 422/258 |
| 2002/0142470 | A1 * | 10/2002 | Clarke | G01N 21/07 | 494/68 |
| 2002/0196435 | A1 * | 12/2002 | Cohen | G01N 33/491 | 356/246 |
| 2003/0094502 | A1 | 5/2003 | Andersson et al. | | |
| 2003/0156763 | A1 * | 8/2003 | Soderman | G01N 35/00069 | 382/262 |
| 2004/0096867 | A1 * | 5/2004 | Andersson | B01L 3/502738 | 435/7.1 |
| 2004/0197233 | A1 | 10/2004 | Nagaoka | | |
| 2005/0026301 | A1 | 2/2005 | Petithory | | |
| 2005/0083781 | A1 | 4/2005 | Caren et al. | | |
| 2006/0153745 | A1 | 7/2006 | Ermakov | | |
| 2008/0252905 | A1 * | 10/2008 | Lee | G01N 35/00069 | 356/615 |
| 2009/0023610 | A1 * | 1/2009 | Peytavi | G01N 35/00029 | 422/240 |
| 2010/0055766 | A1 * | 3/2010 | Hwang | G01N 35/00029 | 435/259 |
| 2011/0085950 | A1 * | 4/2011 | Lee | G01N 35/00029 | 422/537 |
| 2012/0282708 | A1 | 11/2012 | Corbett et al. | | |
| 2012/0314528 | A1 | 12/2012 | Roth et al. | | |
| 2013/0344496 | A1 * | 12/2013 | Peytavi | B01L 3/502746 | 435/6.12 |
| 2015/0238964 | A1 | 8/2015 | Yeo | | |
| 2015/0321192 | A1 | 11/2015 | Lee | | |
| 2015/0367345 | A1 | 12/2015 | Yung et al. | | |
| 2015/0377874 | A1 | 12/2015 | Dangers et al. | | |
| 2016/0279631 | A1 | 9/2016 | Lee et al. | | |
| 2017/0080419 | A1 | 3/2017 | Hori et al. | | |
| 2017/0095814 | A1 | 4/2017 | Boehm et al. | | |
| 2017/0173589 | A1 * | 6/2017 | Clime | B04B 5/0407 | |
| 2018/0364270 | A1 * | 12/2018 | Chiu | G01N 35/00069 | |

FOREIGN PATENT DOCUMENTS

| | | | |
|---|---|---|---|
| EP | 1681553 | A2 | 7/2006 |
| WO | 2014001829 | A1 | 1/2014 |
| WO | 2015132743 | A1 | 9/2015 |
| WO | 2015181725 | A1 | 12/2015 |
| WO | 2017214323 | A1 | 12/2017 |

OTHER PUBLICATIONS

Maximilian Focke, Dominique Kose, Claas Muller, Holger Reinek, Roland Zengerle and Felix Von Stetten, Lab-on-a-Foil: microfluidics on thin and flexible films, Lab on a Chip, The Royal Society of Chemistry 2010, 10 1365-1386.

Fredrickson, Carl K. and Fan, Z. Hugh, Macro-to-micro interfaces for microfluidic devices, Miniaturisation for Chemistry, Biology & Bioengineering, Department of Mechanical and Aerospace Engineering, Department of Biomedical Engineering et al., Lap Chip, 2004, 4, 526-533.

Matthias Geissler, Liviu Clime, Xuyen D. Hoa, Keith J. Morton. Harold hEBERT, Lucas Poncelet, Maxence Mounier, Mylene Deschenes, Martine E. Gauthier, George Huszczynski, Nathalie Corneau, Burton W. Blais, and Teodor Veres, Microfluidic Integration of a Cloth-Based Hybridization Array System( CHAS) for Rapid, Colorimetric Detection of enterohemorrhagic Escherichia coli (EHEC) Using an Articulated, Centrigugal Platform, Analytical Chemistry, Americal Chemical Society, 2015; 10565-10572.

Hendrik Kortmann, Lars Mathias Blank and Andreas Schmid, A rapid, reliable, and automaable lab-on a-chip interface, Lab on a Chip, The Royal Society of Chemistry, Lab Chip, 2009, 9, 1455-1460.

Yuksel Temiz, Robert D. Lovchik, Govind V. Kaigala, Emmanuel Delamarche, Lab-on-a-chip devices: how to close and plug the lab? Microelectronic Engineering 132 (2015) 156-175.

Thomas Van Oordt, Yannick Barb, Jan Smetana, Roland Zengerle and Felix Von Stetten, Miniature stick-packaging—an industrial technology for pre-storage and release of reagents in lab-on-a-chip systems, Lab on a Chip, Miniaturisation for chemistry, physicis biology, materials science and bioengineering, vol. 13, No. 15, Aug. 2013; 2851-3138.

Wang, Jianhua, Lab-on-valve mesofluidic analyticial systems and its perspectives as a “world-to-chip” front-end, Anal Bioanal Chem 2005, 381: 809-811.

Liviu Clime, Jamal Daoud, Daniel Brassard, Lidija Malic, Matthias Geisssler, Teodor Veres, Active pumping and control of flows in centrifugal microfluidics, Microfluidics and Nanofluidics; 2019; Life Sciences Division, National Research Council of Canada, Quebec Canada; pp. 1-22.

O. Strohmeier, M. Keller, FL. Schwemmer, S. Zehnle, D. Mark, F. Von Stetten, R. Zengerle, N. Paust, Centrifugal microfluidic platforms: advanced unit operations and applications, Chem Soc Rev; Royal Society of Chemistry, 2015; 44,6187-6229.

Marc Karle, Johannes Wohrle, Felix Von Stetten, Roland Zengerle, Daniel Mark, Axial Centrifugal Filtration—A Novel Approach for Rapid Bacterial Concentration from a Large Volume, Transducers 2013, Barcelona, Spain, IEEE 2013; 1235-1238.

Adam P. Bouchard, David A. Duford, Eric D. Salin, Non-contact Addition, Metering, and Distribution of Liquids into Centrifugal Microfluidic Devices in Motion, Letters to Analytical Chemistry, Anal. Chem 2010; 82,8386-8389, Art. Centrifugal Fast Analyzers in Clinical Laboratory Analysis, Oct. 1974, pp. 129-191.

Stefan Haeberle, Thilo Brenner, Hans-Peter Schlosser, Roland Zengerle Jens Ducree, Centrifugal Micromixer, Chem. Eng. Technol. 2005; 28, No. 5, 613-616.

Stefan Haeberle, Roland Zengerle, Microfluidic platforms for lab-on-a-chip applications, Lab on a Chip, Miniaturisation for Chemistry, biology & bioengineering, vol. 7, No. 9, Sep. 2007; pp. 1081-1110.

Jaime Castillo-Leon, Winnie E. Svendsen, Lab-on-a-Chip Devices and Micro-Total Analysis Systems, A Practical Guide, 2015.

(56) References Cited

OTHER PUBLICATIONS

Carl K. Fredrickson, Z. Hugh Fan, Macro-to-micro interfaces for microfluidic devices, Miniaturisation for Chemistry, Biology & Bioengineering, Critical Review, The Royal Society of Chemistry, Lap Chip, 2004; 4, 526-533.
R.P. Gregory IV, J. D. Lowry, H.V. Malmstadt, Multichannel Pipet for Parallel Aliquoting of Samples and Reagents into Centrifugal Analyzer Minidiscs, School of Chemical Sciences, University of Illinois, USA, Analytical Chemistry, vol. 49, No. 11, 1977; 1608-1615.
Adam P. Bouchard, David A. Duford, Eric D. Salin, Non-contact Addition, Metering, and Distribution of Liquids into Centrifugal Microfluidic Devices in Motion, Letters to Analytical Chemistry, Anal.Chem. 2010; vol. 82, No. 20, 8386-8389.

* cited by examiner $\alpha = 180°$ $\alpha = 135°$

UNSTABLE EQUILIBRIUM

STABLE EQUILIBRIUM

UNLOADING
$\alpha = 180°$

REACTION
$\alpha = 0°$

LOADING
$\alpha = 0°$

LOADING AND REACTION MODE ($\alpha = 0^{\circ}$)

UNLOADING MODE ($\alpha = 180^{\circ}$)

WORLD-TO-CHIP AUTOMATED INTERFACE FOR CENTRIFUGAL MICROFLUIDIC PLATFORMS cl Cross-Reference to Related Applications This application is a national phase entry of International Patent Application PCT/IB2019/059715 filed 12 Nov. 2019, which claims the benefit of U.S. Provisional Patent Application Ser. No. 62/760,256 filed 13 Nov. 2018.

BACKGROUND

Field of Endeavor

The present invention relates to devices, systems, and processes useful as automated interfaces for centrifugal microfluidic platforms.

Brief Description of the Related Art

Lab-on-a-chip (LOC) devices have become central to a number of applications, which include point-of-care diagnostics, genomic and proteomic research, and the detection of pathogenic agents, among other things. These miniaturized systems offer many advantages over conventional instrumentation since they provide a plausible mean for controlling the flow of liquids, minimizing the consumption of sample and reagents, increasing reaction times, performing multiplex analysis with a high degree of parallelization, while reducing hands-on engagements and associated risks of contamination. In addition, these systems offer a suitable path toward portability, remote operation, and a relatively low cost per assay. Fluidic structures can be produced with sub-micrometer resolution in a variety of materials while flow in these systems can be induced, sustained and controlled using both external and internal pumping, valving and actuation schemes.

The world-to-chip interface is an important aspect of all LOC devices, as it largely determines how they are conceived with respect to design, fabrication, and functioning. The world-to-chip interface can fulfill several different functions, which all translate to some form of connectivity between the microfluidic device and bulk components at the periphery such as reservoirs, pumps, or valves. A world-to-chip interface is mainly used to mediate the exchange of reagents, samples, and products of reactions which includes their transfer from an external source onto the chip as well as their recovery from the chip. As a dispensing unit, it must offer a plausible solution for solving the mismatch that exists between volumes that can be processed at the macroscopic level (sometimes in the milliliter range) and those that are prevalent at the chip level (microliters to hundreds of microliters). Moreover, the world-to-chip interface provides an effective means for applying pressure to selected sites on the device using an external pump. LOC devices that use integrated sensor elements based on electrochemical, optical, or magnetic principles often need to be powered from an external source and therefore require an interface that is adequate to these ends (e.g., by incorporating magnets, optical fibers, or electrical interconnects). Regardless of its constitution and intended use, an interface generally must be reliable, convenient to operate, and preferably low-cost. The development of suitable world-to-chip interfaces is a particular challenge for centrifugal LOC systems since the scenario of a rotating chip considerably limits the options that are available for these platforms. The inventions disclosed herein include the automation of fluid dispensing into microfluidic devices in the context of centrifugal microfluidic platforms.

One of the main issues that currently limits the widespread use of LOC systems is the lack of standards with respect to interfacing and connecting microfluidic devices in order to dispense fluids onto the chip. To this end, most systems rely on custom solutions that are developed for a specific application which is performed inside a standard laboratory setting. Many of these solutions still involve manual intervention such as pipetting or some sort of plugging which is time consuming, can damage the chip, or may cause leakage. While few standard formats exist (e.g., Luer Locks), they are not universally applicable and can be fabricated only in a relatively small range of materials (e.g., thermoplastic polymers).

Current protocols for standard bioassays such as ELISA (enzyme-linked immunosorbent assay) involve robotic or manual dispensing of various reagents, many of which are available commercially (e.g., Qiagen QiaCube, etc). Furthermore, in most academic settings and commercially available products (e.g., Abaxis Piccolo XPress), centrifugal microfluidic cartridges are loaded by manually or robotically pipetting via inlet holes using pipettes or syringes.

Therefore, loading of microfluidic devices (including both rotating and stationary systems) is typically performed by using a pipette to insert the reagents and buffers one at a time through access ports. Each liquid is pipetted into reservoirs on the chip which typically contain, in addition to the loading access port, a vent to evacuate air while the liquid is loaded. This process is done manually at the beginning of the assay and typically takes a few minutes. Although manual feeding by the operator is still widespread across the LOC community, it is of limited practical value for applications outside a standard laboratory setting. This is especially important when low amounts of volume need to be dispensed with high precision in a repetitive manner.

Centrifugal microfluidics has the advantages of simple operation, almost zero dead-volumes and the possibility to perform complex on-chip protocols while in rotation. When in automated mode, they are however handicapped in the case of applications requiring large volumes (such as buffers, other reagents) by the lack of metering capabilities to dispense precise amounts of liquids onto the chip while in rotation.

Reagents and buffers can also be inserted on the chip during the manufacturing stage of a microfluidic device. To confine the liquids and avoid evaporation, this is typically achieved by encapsulating the reagents and buffers in sealed blisters. The blisters are then opened by the end user just before the assay, for example, by using structures integrated in the holders of the device. Alternatively, in centrifugal microfluidics, the blisters can be designed to burst only when a specific rotation frequency is reached. While solving several limitations of manual pipetting, blisters also have drawbacks.

Recently, some of the inventors herein have proposed a method to automate the loading of reagents in the centrifugal microfluidic devices from external storage reservoirs. This system is based on a centrifugal platform with integrated lines that can be pressurized while the platform is rotating at high speed. Using these pressure lines, liquid can be transferred from external containers placed on the centrifuge to the microfluidic device. The external containers can have volumes much larger than those of the microfluidic reservoirs on the chip, thus enabling loading of various buffers and reagents for multiple sequential tests and minimizing the need for manual interventions. This method also allows for transferring liquids from the microfluidic device to an external waste container, making it possible to perform assays with volumes that exceed the capacity of the microfluidic device at once. Thus, this method removes the need for integrating on-chip reservoirs for buffers, reagents, and waste, which provides the possibility to greatly simplify the design of the microfluidic devices and reduce their size and fabrication cost. The external containers required for an assay can be assembled in a cartridge and the connections from the microfluidic device to the external containers can be realized by using an array of standard connectors (e.g., Luer Lock) placed on top of this cartridge. The end user can then simply clip the microfluidic device to this cartridge, greatly reducing the number of manual steps required to setup an assay. However, reagent and waste fluids have to be accommodated on the rotor of the platform, which limits the applicability in many applications requiring large volumes of reagents.

Pipetting is not practical outside of laboratories where high precision pipettes are not always available. While not very complex, the process of pipetting liquids inside a microfluidic device is not necessarily straightforward and often requires some training. Training of end users is not always possible or practical (e.g., in point-of-care applications). Even after training, user errors during pipetting are common and can lead to unexpected failure of the assay.

The liquids may reach undesired locations inside the microfluidic device during pipetting. For example, priming of siphon or capillary valves due to pipetting problems is a common problem in centrifugal microfluidics. Also, the pipetted liquid can touch the vent hole of the reservoir before the required volume is transferred. In this case, the air may not be able to escape reliably from the reservoir, which can then force some liquid out of the reservoir through the vent hole. Structures can be integrated inside the reservoirs of the microfluidic devices to guide the liquids during pipetting. This however increases fabrication complexity and is only mildly effective for liquids having a low contact angle with the materials of the microfluidic device.

Pipetting of highly wetting reagents (such as oils and organic solvents) is typically very challenging. The low contact angle of these liquids promotes capillary action, which can transfer the liquid to unwanted locations (e.g., outside target reservoir, etc.).

Pipetting of solutions with high viscosities is not precise with standard pipettes and requires special equipment that is not always available to the end users.

The pipetting process can leave traces of reagents, buffers, or samples around the access holes of the microfluidic devices. During centrifugation, these liquids can create contamination of the device and the platform. This can also cause health and safety issues when pathogenic samples or dangerous reagents are being used.

The time required for pipetting becomes problematic when multiple assays are performed in parallel or when the number of reagents and buffers required for a particular assay is large.

In some centrifugal microfluidics assays, the access holes used to load the liquids must be blocked after the pipetting step, adding another manipulation that requires time and can lead to failure of the assay when not performed properly by the operator.

In centrifugal microfluidics, the reservoirs of the microfluidic devices must be large enough to accommodate all the reagents and buffers required for an assay. The space required by the reservoirs and wastes typically occupies a very large fraction of the overall area available on the microfluidic device, limiting the space available for the assay. The space occupied by the reservoirs also has a large impact on the total dimensions of the microfluidic devices, therefore increasing fabrication cost. Alternatively, some reservoirs can be replenished multiple times during an assay. However, repeated manual interventions are not practical and often defeat the purpose of automation.

The limited space available on the microfluidic devices also limits the maximum volume that can be stored for each reagent. This is particularly problematic for assays requiring very large volumes of wash buffer (e.g., Elisa assay, etc.).

As discussed briefly above, long-term reagent stability is often problematic in blisters, limiting shelf life of the microfluidic devices or forcing storage at low temperatures. For some reagents, it is often possible to improve stability by drying. The dried reagent is then inserted on chip along with a blister pouch filled with a resuspension buffer. Achieving uniform resuspension of the dried reagents upon release of the liquid can, however, be difficult and often requires implementation of complex mixing protocols.

The integration of blisters increases fabrication complexity, cost, and development time of the microfluidic devices.

Entirely emptying the blisters can be challenging, which can be problematic when the assay requires precise liquid metering. Additional structures can be integrated on the microfluidic device to perform metering, but this increases the space requirement.

The size of the blisters and associated reservoirs must be large enough to accommodate all the reagents and buffers required for an assay. As described previously, this increases the size and cost of the microfluidic devices. Also, assays requiring large volumes or a large number of different solutions are difficult to implement with blisters.

Achieving high reliability for the operation of the blisters requires high control of the manufacturing conditions. This is particularly true when the blisters are designed to release the liquids at a specific rotation frequency.

Automated reagent loading from external containers is only available for centrifugal microfluidic platforms with pneumatic control, such as the one disclosed in WO 2015/132743. As stated above, limitations in applications requiring large amounts of liquid reagents and waste fluids are inherent Transfer of precise volumes of liquid from the external container to the microfluidic device is challenging to achieve with pressure-based control. Metering channels with tight fabrication tolerances must be integrated in the microfluidic devices. The level of liquid in the external container, the rotation speed of the platform, and the liquid viscosity must also be taken into account to achieve precise metering. Errors in metered volumes can affect outcome of the assay and its reproducibility.

Running multiple tests simultaneously is challenging with automated reagent loading from external containers. Indeed, one set of external reservoirs is required for each assay ran concurrently. The size and weight of the external containers therefore grow rapidly with the number of concurrent tests. While on-chip multiplexing is possible (i.e., having several tests performed in each microfluidic device), it complicates chip design and liquid metering. Also, when the platform is designed to run multiple assays concurrently, it is necessary to block or otherwise deactivate the unused sets of external containers to avoid liquid spills from the locations that are not coupled to a microfluidic device.

All the external containers required for the assays must be placed on the rotating platform. The combined weight of the rotating liquids put additional stress of the rotating platform, increasing its size, weight, complexity, and cost. Balancing of the rotating platform can also be difficult to achieve when large volumes are stored in several different groups of external containers.

The cartridge with the containers and standard connectors (e.g., Luer Lock) must be precisely manufactured to ensure leak free operation.

There thus remains numerous unmet needs in automated LOC design and use.

SUMMARY

Automated loading methods and systems, into assay-specific centrifugal microfluidic cartridges, as described herein are thus designed to address some or all the aforementioned limitations in the field. In performing an automated bioassay, certain conditions must be met while maintaining reproducibility: (i) the ability to store and exchange reagents, (ii) operability with minimal conservative volumes and waste generation while maintaining throughput (e.g., reasonable processing times and the possibility of performing tests in a multiplex format), and (iii) outfitting the platform for various bioassays (for, e.g., not limited only to a certain type of ELISA).

According to a first aspect of the invention, a system useful for delivering liquid to a microfluidic chip comprises a centrifugal microfluidic platform including a rotatable rotor configured to receive at least one lab-on-chip on a top surface of said rotor, and a stationary liquid pumping system positioned adjacent to said centrifugal microfluidic platform, said liquid pumping system comprising at least one stationary nozzle positioned above said rotor top surface for dripping liquid into said microfluidic chip when mounted on said rotor top surface, without any physical contact or coupling between said at least one nozzle and said microfluidic chip.

In such a system, the centrifugal microfluidic platform can comprise an articulated centrifugal platform.

In such a system, the centrifugal microfluidic platform can comprise a powered centrifugal platform.

In such a system, the liquid pumping system can comprise a peristaltic pump.

In such a system, the liquid pumping system can comprise a pneumatic pump.

In such a system, the liquid pumping system can comprise a syringe pump.

In such a system, the liquid pumping system can comprise a piezoelectric pump.

According to another aspect of the invention, a microfluidic lab-on-chip comprises a chip body, a loading chamber formed in the chip body, a large diameter loading port formed in the top of the loading chamber which exposes the loading chamber to the exterior of the chip body, and at least one fluidic channel formed in the chip body in fluid communication between the loading chamber and the exterior of the chip body.

In such a lab-on-chip, the loading port can have a diameter of at least D+2E, were D is the diameter of a liquid drop to be loaded into said loading chamber and E is the imprecision in angular positioning of a microfluidic platform upon which said lab-on-chip is to be positioned.

In such a lab-on-chip, the loading chamber can have a floor coated with a hydrophilic material to enable droplet spreading.

In such a lab-on-chip, the hydrophilic material can be a microstructured or/and nanostructured material.

In such a lab-on-chip, the nanostructured material can be embossed on the floor of the loading chamber.

In such a lab-on-chip, the hydrophilic material can comprise a sheet of absorbent paper or an absorbent membrane.

In such a lab-on-chip, the chip body can be disc-shaped.

Such a lab-on-chip can further comprise a metering channel formed in said chip body fluidly connecting said loading chamber to the exterior of said chip body, said metering channel for metering precise amounts of liquids before transferring out of said loading chamber.

Such a lab-on-chip can further comprise a reaction chamber formed in said chip body, a fluid channel formed in said chip body directly fluidly connecting said loading chamber to said reaction chamber, and an exit channel formed in said chip body directly fluidly connecting said reaction chamber to the exterior of said chip body.

Such a lab-on-chip can further comprise an exit channel formed in said chip body directly fluidly connecting said loading chamber to the exterior of said chip body.

According to yet another aspect of the invention, a method of aligning multiple stationary liquid dispensing nozzles of a liquid pumping system with multiple loading ports on a microfluidic chip using an articulated microfluidic platform with two degrees of freedom comprises rotating said platform while retaining said chip on said platform about a primary axis and generating a driving centrifugal force field, and rotating said chip about a secondary axis offset from said primary axis to change an orientation of said chip with respect to said centrifugal force field.

According to yet a further r aspect of the invention, a combination comprises a microfluidic chip as set forth above, an articulated centrifugal microfluidic platform, wherein the platform can rotate about an axis, a stationary waste collector having a cavity, the waste collector positioned away and separated from the microfluidic chip, and a chip holder mounted to said platform and retaining said microfluidic chip.

In such a combination, the microfluidic chip can be positioned on the chip holder such that the at least one fluidic channel opens toward the waste collector.

In such a combination, the microfluidic chip can have channel openings on an edge thereof adjacent to said waste collector only such that, in a first orientation, liquid in said microfluidic chip is indefinitely retained in the microfluidic chip, and in a second orientation, liquid in said microfluidic chip can exit the microfluidic chip towards said waste collector.

Such a combination can further comprise liquid absorbent material in said waste collector.

In such a combination, the absorbent material can be paper based.

In such a combination, the absorbent material is fabric based.

In such a combination, the absorbent material is a porous polymer.

In such a combination, the waste collector comprises a 3D design which inhibits liquid from exiting the waste collector.

According to yet another aspect of the invention, a combination comprises a microfluidic device as set forth above, a centrifugal microfluidic platform including a plurality of dispensing nozzles, and a stationary ring-shaped waste reservoir.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
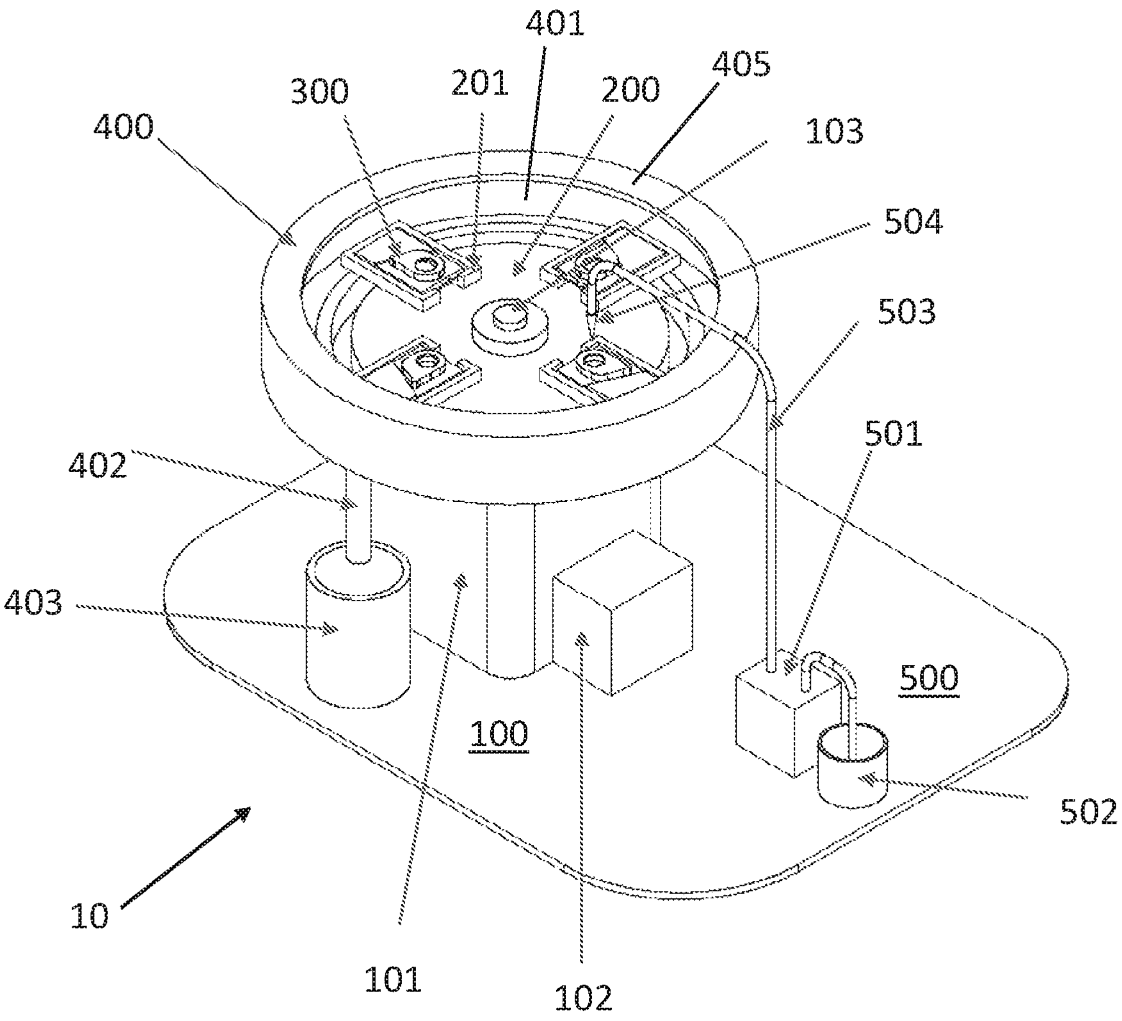
FIG. 1 illustrates a perspective view of a first exemplary embodiment of a centrifugal microfluidic platform system.

Referring to the drawing figures, like reference numerals designate identical or corresponding elements throughout the several figures.

The singular forms "a," "an," and "the" include plural referents unless the context clearly dictates otherwise. Thus, for example, reference to "a solvent" includes reference to one or more of such solvents, and reference to "the dispersant" includes reference to one or more of such dispersants.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a range of 1 to 5 should be interpreted to include not only the explicitly recited limits of 1 and 5, but also to include individual values such as 2, 2.7, 3.6, 4.2, and sub-ranges such as 1-2.5, 1.8-3.2, 2.6-4.9, etc. This interpretation should apply regardless of the breadth of the range or the characteristic being described, and also applies to open-ended ranges reciting only one end point, such as "greater than 25," or "less than 10."

The subject matter described herein provides world-to-chip interface apparatus and methods for centrifugal microfluidic platforms. It can be also used in conjunction with any type of centrifugal microfluidic platforms or lab on a chip instruments, and can be particularly advantageous when implemented with articulated centrifugal platforms as disclosed in WO 2015/181725. An articulated centrifugal microfluidic platform allows the microfluidic chips mounted on it to rotate about a secondary axis while the platform is spinning at high speed, changing in this way the orientation of the microfluidic chip with respect to the centrifugal force.

In general terms, a world-to-chip interface apparatus as described herein can include a liquid pumping system that transfers metered amounts of biochemical reagents from large stationary reservoirs to chambers on microfluidic chips mounted on centrifugal microfluidic platform, such as an articulated centrifugal platform (see, e.g., WO 2015/181725). The pumping system can make use of any type of liquid actuation principle such as peristaltic, pneumatic, or others for which the amount of liquid transferred to the chip can be accurately controlled. Alternatively, syringe-type pumps, in which the pump chamber and reservoir are integrated together, and a piston and plunger are moved by a suitable linear actuator or motor or the like, can also be used.

An element that can be very important in many implementations is that the transfer is realized without any physical coupling or contact between the liquid dispensing nozzle and the chips, but is instead achieved by dripping small droplets of liquid from one or more dispensing nozzles. These dispensing nozzles are situated at the end of a feeding tube placed vertically above the rotation plane defined by the microfluidic chips. The microfluidic chips include a special microfluidic chamber capable of receiving liquids from the dispensing nozzle through a designated opening with a diameter larger than the size of individual droplets dripping from the nozzles. The size of the droplets are, in turn, dependent on the liquid being dispensed and the geometry of the nozzle's opening, both of which are known quantities for any particular liquid and dispensing system, and thus the diameter of the opening into the chip's chamber can be mathematically predetermined, or determined empirically.

In one aspect of the invention, the centrifugal microfluidic platform is operated in three modes: (i) the loading mode, where the rotor is stopped and the microfluidic chips are aligned at predefined positions for liquid transfer from the dispensing nozzles, (ii) the reaction mode, where the platform rotor is either spinning at high speed or stopped at a random position for incubation, where the microfluidic chip is performing various steps of the biochemical assay and, (iii) the unloading mode, where the liquids are extracted from the chip and sent to an external waste chamber.

In a loading mode, the microfluidic platform stops at predefined angular positions to align the chips with the dispensing nozzle and a metered amount of liquid is transferred from the external stationary reservoirs to specially designed loading chambers on the chips. The loading of these microfluidic chambers on several independent chips can be done in parallel using multiple dispensing nozzles simultaneously aligned with the chambers. However, to minimize the number of nozzles and the complexity of the pumping system, it is preferable that multiple chambers on multiple chips are loaded through the same nozzle. This can be achieved by sequentially aligning the microfluidic chambers of all the chips with the nozzle using the rotation of the platform.

In a reaction mode, the platform rotor starts spinning at high speed and the liquids are transferred to the appropriate reaction chambers through centrifugation. In the case of the articulated centrifugal microfluidic platform, the orientation of the microfluidic chip can also be changed within certain limits to transfer liquids internally from chamber to chamber or to perform special microfluidic steps such us mixing or enhanced capture. The platform can also be stopped for incubation steps as the design of the chip allows for maintaining liquids in the reaction chamber for a relatively long period of time.

In an unloading mode, one or more liquids are removed from the microfluidic chips and sent to a waste reservoir. In the case of the articulated centrifugal microfluidic platform, the microfluidic chips are placed in a special orientation with respect to the waste chamber such that one or more liquids from the microfluidic chips are expelled through channels having openings at one of the microfluidic chip edges. This step is performed at high speed only and the design of the chip, as well as its orientation relative to the centrifugal field, are chosen such that efficient transfer of liquid droplets from the microfluidic chip to the waste reservoir is achieved with no liquid loss in between.

In another variant, the microfluidic devices are replaced by a disc with equivalent microfluidic circuitry having a central liquid receiving chamber with an opening at the center of the disc and on the platform main rotation axis. The dispensing nozzles are placed above the opening of the central reservoir which is large enough to accommodate all required dispensing nozzles directly above the opening. In this embodiment, the liquid loading from the dispensing nozzles can be performed without having to align the microfluidic device or even to stop the rotation of the platform as the opening of the central reservoir remains aligned at all time with the dispensing nozzles during the rotation of the platform. The central reservoir might be part of a single circular disk-like microfluidic device or might be connected to several independent microfluidic devices with tubing. Metering structures can be integrated in the central reservoir to ensure uniform distribution of the dispensed liquid to all the microfluidic devices or to several locations inside a disk-like microfluidic device. An advantage of this embodiment is to reduce the number of operations that must be performed for the dispensing process, which can greatly speed-up the assay when a large number of microfluidic devices must be filled. It also reduces the risk of misaligning the microfluidic devices with the dispensing nozzles following hardware issues. However, in this embodiment, all the liquids must transit through the same centrally located reservoir, which can potentially cause cross contamination issues for some assays.

From a microfluidic perspective, a potentially important element of the subject matter of this disclosure is the design of waste-free microfluidic chips that enable the transfer of large volume of liquids from the dispensing nozzles to small microfluidic chips and from these chips to the waste after the reaction is done. The new type of microfluidic circuits proposed here includes a chip where at least one channel is opened to the surrounding air, providing a way to empty the microfluidic chips. Although similar approaches have been proposed (see, e.g., U.S. Pat. No. 8,444,934 B2), the one described here is different from several points of view. First, in the case of the articulated centrifugal platform, the openings of the microfluidic channels are designed at the proximal edge (with respect to the rotation center) and not at the distal edge of the chip as in U.S. Pat. No. 8,444,934 B2. This is enabled by the additional degree of freedom provided by articulated microfluidic platforms which allow for changing the angle of the chip with respect to the centrifugal force and pointing the channel openings preferentially either toward the waste or away from it. A second difference includes the fact that, instead of a waste which is part of the microfluidic disc and rotates with it, a stationary waste is provided as a part of the instrument case, coupled to an external large reservoir which can accommodate large amounts of liquid waste. A third and last difference lies in the fact that, because the microfluidic chips cannot rotate with respect to a secondary axis, the channels openings described in U.S. Pat. No. 8,444,934 B2 are always pointed toward the waste and the liquids cannot be maintained inside the reaction chambers on the chip indefinitely, as is the case in the devices described herein.

The waste reservoir is generally decoupled from the microfluidic chip and placed nearby to collect the waste liquids expelled from the microfluidic chip. The waste reservoir can also be placed on the rotating holder close to the microfluidic device instead of being stationary, collecting the liquid dripping from multiple channels/chips at a time. The waste reservoirs typically have a large opening for receiving the liquids from the chip(s) and can be eventually be filled with liquid absorbent material to prevent splashing and undesired liquid displacements.

While the interruption of microfluidic channels through openings to the surrounding air is typically used as a way to send the reaction products to the waste, it can also be provided more upstream as well. For example, a secondary channel connected to an opening can be used to precisely meter the liquid transferred from a dispensing nozzle by sending excess liquid directly to the waste. This metering process can be performed just after dispensing, before the liquid is transferred and processed in the microfluidic device. This can be used to circumvent the intrinsic imprecision of the droplet-by-droplet dispensing of the dispensing nozzles (i.e., volume transferred cannot be controlled more precisely than the volume of a droplet).

The implementation of waste reservoirs decoupled from the microfluidic chips can reduce the size of the microfluidic chip drastically, which can be a very interesting advantage for commercialization. The apparatus and methods described herein also enable the use of large amounts of liquids on small microfluidic chips, which is paramount for highly sensitive bioassays such as ELISA, requiring a large volume of wash buffer.

In this description, the term "articulated centrifugal microfluidic platform" is intended to include centrifugal microfluidic platforms with articulations between chip holders and rotors, that is, the microfluidic chips/holders are provided with an additional degree of freedom in a form of a controlled rotation with respect to a secondary axis. Examples of this type of platforms are described in more detail in WO 2015/181725 and Geissler, M., et. al., "Microfluidic Integration of a Cloth-Based Hybridization Array System (CHAS) for Rapid, Colorimetric Detection of Enterohemorrhagic Escherichia coli (EHEC) Using an Articulated, Centrifugal Platform", Anal. Chem., 2015, 87 (20), pp 10565-10572.

The term "classical microfluidic platform" is intended to include any centrifugal microfluidic apparatus having a simple rotor with holders for a microfluidic disc or chips and where the rotor is coupled to a motor in order to induce rotation of the microfluidic disc or chips with respect to the axis of this motor solely.

The term "pneumatically actuated centrifugal microfluidic platform" is intended to include centrifugal microfluidic platforms with miniature pumps and valves integrated on the rotor to pneumatically control flows in microfluidic devices. Also, centrifugal platforms where the actuation pressure is transferred to the rotation platform (to the microfluidic devices) through rotary unions are also included. Examples and detailed descriptions of such platforms can be found in WO 2015/132743 and Clime, L., et al. "Active pneumatic control of centrifugal microfluidic flows for lab-on-a-chip applications", Lab Chip 2015 (The Royal Society of Chemistry, 2015)

Preferred embodiments of the apparatus and methods are described in greater detail in the following.

A first preferred embodiment relates to an apparatus for performing automated microfluidic assays and includes a combination of an articulated centrifugal microfluidic platform and a stationary liquid pumping system capable of loading aqueous solutions into microfluidic chips by dripping through dispensing nozzles without any physical contact of coupling between the nozzles and the microfluidic chips.

FIG. 1 illustrates a lab-on-a-chip (LOC) instrument with a world-to-chip interface combining a centrifugal microfluidic platform 100 and a stationary liquid pumping system 500 including a pump 501, a liquid (reagent) reservoir 502, a coupling tube between the pump and the liquid reservoir, a coupling tube 503 between the pump and the centrifugal microfluidic platform, and a dispensing nozzle 504 at the end of the tube 503. Both elements (centrifugal platform and liquid pumping system) are controlled by an electronic control unit 102 to control the motor 101 and the pumping system 501.

The centrifugal platform includes has a rotor 200 with articulated holders 201 which can accommodate microfluidic chips 300 and can rotate about a secondary axis different from the main rotation axis 103.

The centrifugal platform also has a stationary waste collection system 400 in a form of a ring that surrounds the edge of the rotor and is coupled with a waste reservoir 403 via a tube 402.

More specifically, as illustrated in FIG. 1, a centrifugal microfluidic platform 10 having a main motor and axle 100, a centrifuge rotor 200, and a liquid (reagent) pumping system 500, is controlled by the same electronic control unit 102, which ensures proper alignment of the microfluidic chips with the dispensing nozzles during liquid transfer. Alternatively, separate electronic control units (not illustrated) can be used to separately control each subcomponent. The pumping system extracts liquid from a large reservoir 502 and sends it to the microfluidic chip 300 through a tube 503 and a dispensing nozzle 504 at the end of the tube. The liquids/reagents to be used are contained in one or more external stationary reservoirs 502 and coupled to the extraction pump 501 with the help of a tube. At the end of each, e.g., assay step, the undesired liquids are expelled from the chip into a stationary waste collector 400, which is positioned radially outside of the rotor 200.

According to an exemplary embodiment, the waste collector 400 includes a cavity 401, which is preferably annular, formed in a ring-shaped body 405, and a collection tube 402 for sending the waste liquids to a large external reservoir 403. The microfluidic chips 300 are contained by the centrifuge rotor 200 in special holders 201 which can have a controlled rotation about a secondary axis parallel to, but different from, the main rotation axis of the main motor spindle, as described in greater detail elsewhere herein.

Although only four holders with one microfluidic chip per holder are illustrated in this FIG. 1, platforms with several or less holders and a multitude of chips per holder can also be used.

Figure 2A:
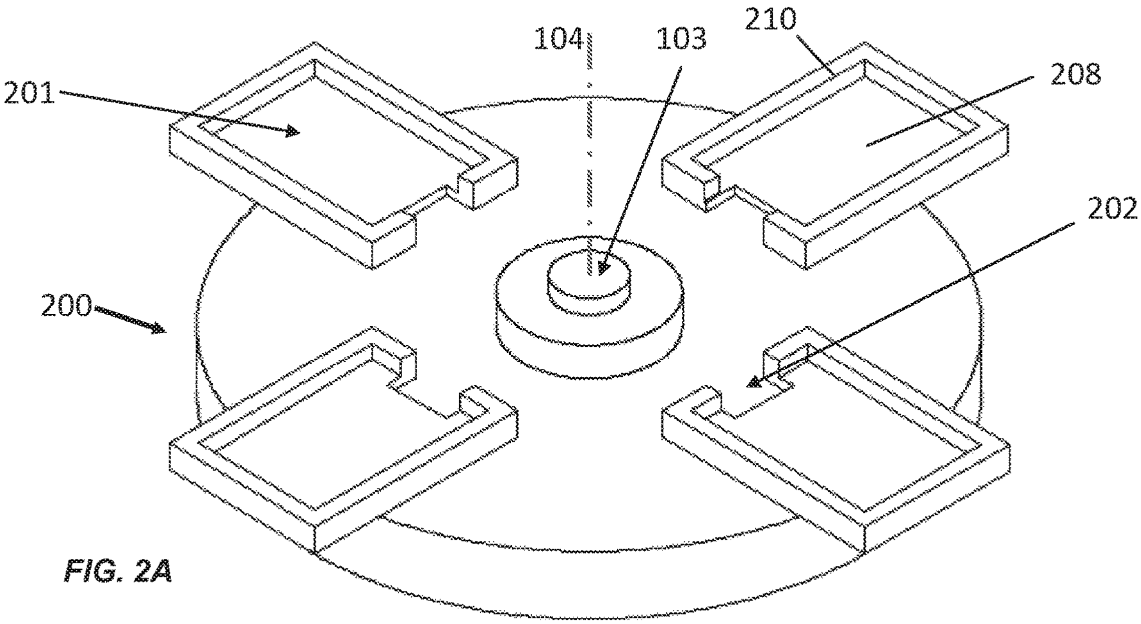
FIGS. 2A-B illustrate perspective and cross-sectional views, respectively, of a rotor.
Figure 2B:
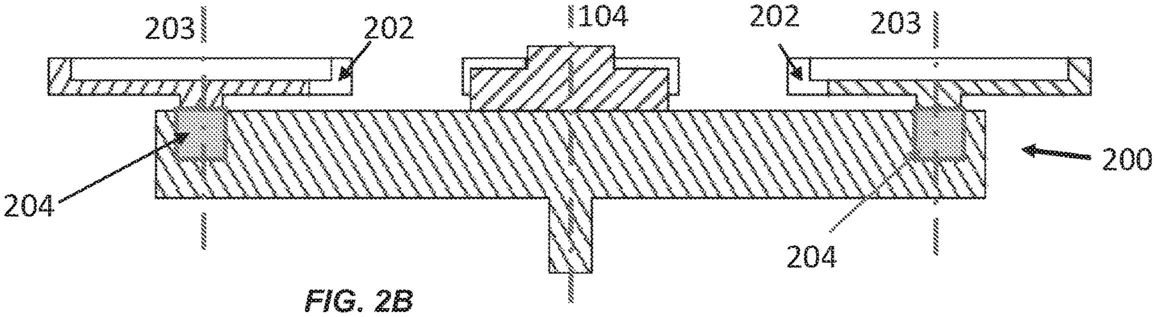

FIGS. 2A and 2B illustrate a more detailed top perspective view (FIG. 2A) and a cross-sectional view (FIG. 2B) of an exemplary rotor 200. The chip holders 201 are each secured to the rotor, and can each rotate about a secondary axis 203 which is different from the main rotation axis 104 of the centrifuge. In a first exemplary embodiment, the chip holders 201 are formed as rectangular shallow trays, with a top surface 208, and four walls 210 which extend upwardly from the top surface at the outer edge of the holder, and together form a shallow recess in which a microfluidic chip can be positioned. According to an alternative embodiment, the walls 210 can be discontinuous, or take to form of a plurality of upstanding posts, which similarly retain a chip in the recess. The chip holders 201 have openings 202 on at least one side, forming a hole in one end wall 210, the top surface 208, or both, to allow liquids to be ejected from the chip and sent to the waste, e.g., by centrifugal force when the centrifuge is rotating. Optionally, both ends of the holder 210 can include an opening 202. If the microfluidic chip to be used in the system has a non-rectangular shape, the holder 201 has walls 210 which are shaped to retain the chip in the holder. The chip holders 201 are actuated with a special mechanism 204 of any of the types described in WO 2015/181725, which allow for fine rotation and positioning of the chip holders with respect to the rotor as illustrated in FIGS. 3A and 3B.

Figure 3A:
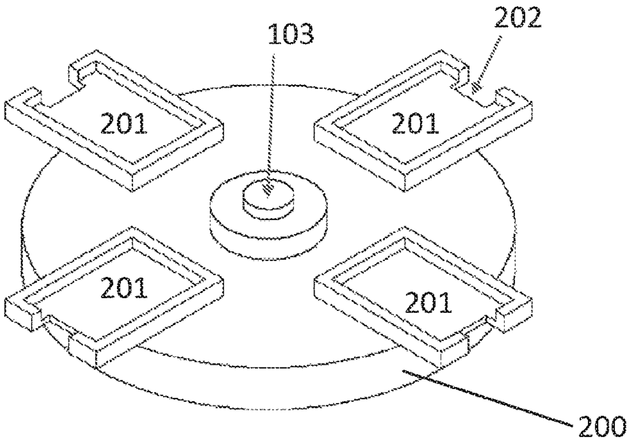
FIGS. 3A-B illustrate perspective views of a rotor with chip holders in two different orientations.
Figure 3B:
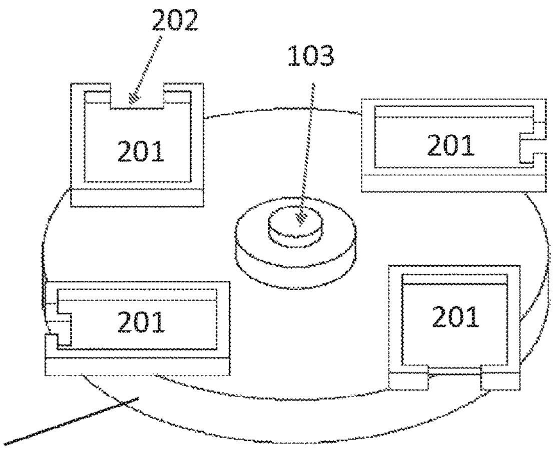

FIGS. 3A and 3B illustrate the positioning of the chip holders 201 in the unloading mode when the liquids are ejected from the microfluidic chips and sent to waste (FIG. 3A), and an intermediary angular position (135 degrees; FIG. 3B).

As shown in FIGS. 2A-3B, the holders 201 have a special design with an opening 202 on one of the edges which allows them to accommodate a special type of microfluidic chips that expels liquids through open microfluidic channels. The position or orientation of the chip holders 201 for normal operation is with the openings 202 close to the rotation center (FIG. 2A), while in the unloading mode, in which liquids are expelled from the chip, the chip holders are rotated by 180 degrees about the secondary axis 203 (FIG. 3A) with the help of the mechanism 204 such that the opening(s) are pointing toward the circumference of the rotor. An intermediary angle (135 degrees) is also illustrated in FIG. 3B for clarity, e.g., an intermediate orientation of the chip holders 201 with respect to the rotor.

Figure 4A:
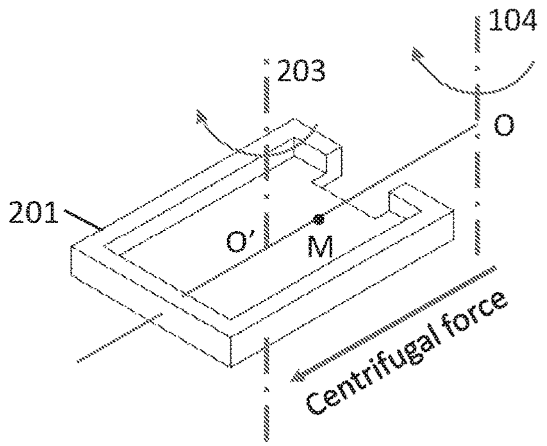
FIGS. 4A-B illustrate chip holders in two different orientations, relative to the direction of centrifugal force.
Figure 4B:
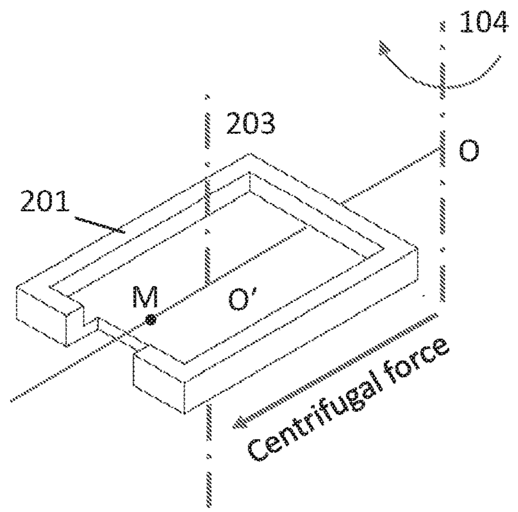

The mechanism 204 can be any active mechanism which allows control of angular orientation with desired speed and accuracy such that a step motor, a DC motor with an arc spring, a squiggle motor, and the like. However, in a preferred embodiment the actual mechanism is a passive one and includes a holder with the center of mass M displaced away from the secondary rotation axis 203 as illustrated in FIGS. 4A and 4B. In the normal (assay) operation mode, the holder is locked in an unstable equilibrium position where the center of mass M is between the two rotation centers O and O' (FIG. 4A). When the holder is unlocked, a slight circumferential acceleration continued by constant-speed spinning moves the center of mass M away from the direction OO' and forces the holder into a stable equilibrium orientation with the center of mass M away from the secondary rotation center O' (FIG. 4B). In this preferred embodiment, the mechanism 204 can be simply a spring that resists the rotation about the secondary axis 203 and pushes the holder into the initial position as soon as the platform is stopped. The holder 201 can be additionally locked into this position with the help of electromechanical (or pneumatic) locks 205 (FIGS. 5A, 5B) which can include, for example, simple pins 26 that move up and down from the rotor to the microfluidic chip holders, by actuation of the actuator 205 and engage with, e.g., the lower surface of the holder 201 or the opening 202 (not illustrated).

FIGS. 4A and 4B thus illustrate a special type of holder 201 having a center of mass M displaced radially with respect to the center of rotation O'. In the reaction mode (FIG. 4A) the holder 201 is oriented with the opening 202 toward the rotation center O of the platform and the holder is in an unstable equilibrium position. By rotation at moderate speeds, the center of mass M is pushed radially away from the rotation center and the holder 201 changes its orientation by 180 degrees and switches to a stable equilibrium position where the opening 202 points toward the waste (FIG. 4B).

Figure 5A:
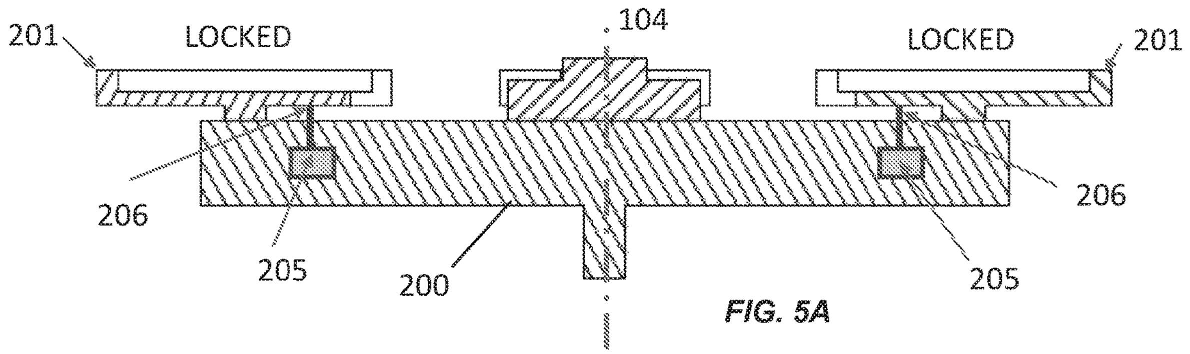
FIGS. 5A-B illustrate cross-sectional views of another exemplary rotor, with chip holders, in locked and released configurations.
Figure 5B:
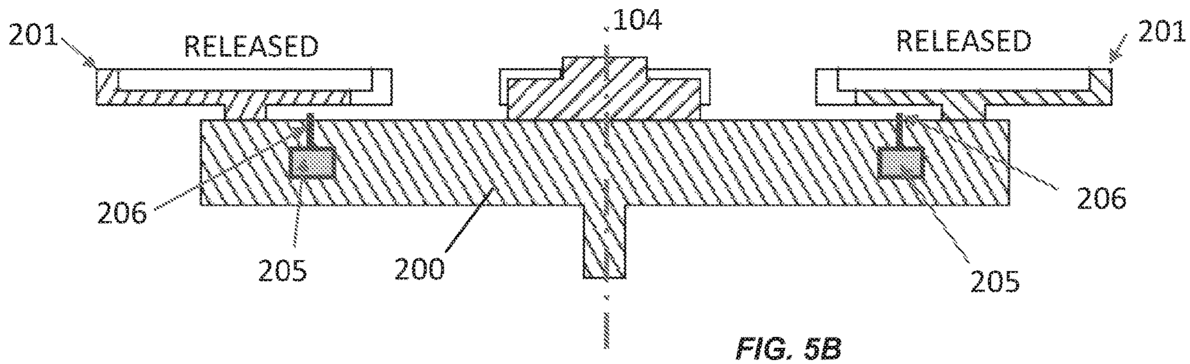

FIGS. 5A and 5B illustrate exemplary solutions to the problem of the unstable equilibrium positions in the reaction mode, in which a pin 206 is pushed from the rotor with the help of an electromechanical or pneumatic mechanism 205 and fixes the holder in a stable position (FIG. 5A) with respect to the rotor.

Figure 6A:
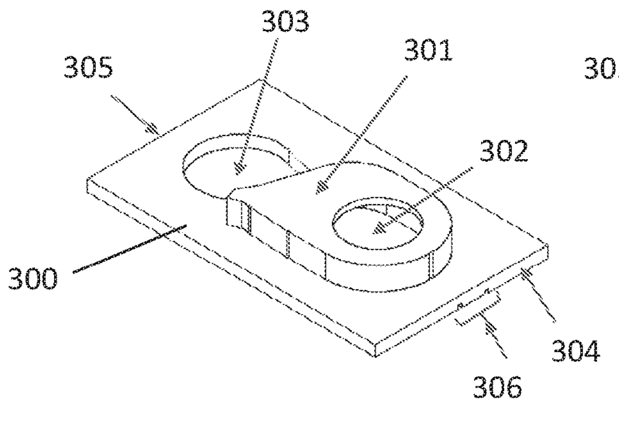
FIGS. 6A-B illustrate top and bottom, respectively, perspective views of an exemplary microfluidic chip.
Figure 6B:
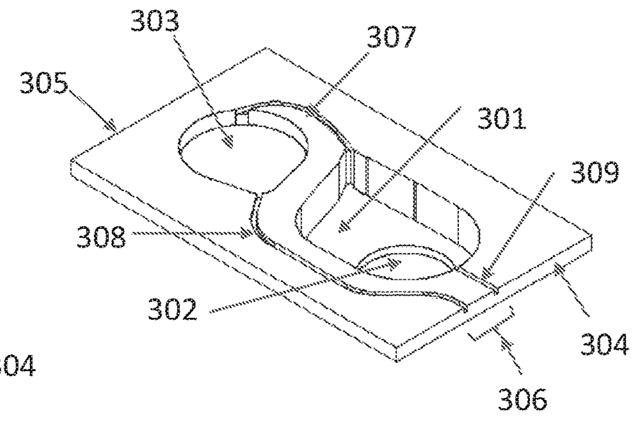

FIG. 6A illustrates an exemplary microfluidic chip 300 to be used with interfaces described herein, which includes at least a loading chamber 301 formed in a (e.g.) rectangular body 304, with an upwardly facing feeding hole 302 and a reaction chamber 303 coupled on one side to the loading chamber via a fluidic channel 307 (see FIG. 6B, showing a bottom view). In some embodiments, the loading chamber 301 extends away from the body 304, as illustrated, to form the chamber with upstanding walls, which reduces material costs; however, if a thicker body 304 is used, the chamber 301 can be formed entirely within the body. Reaction chamber 303 and loading chamber 301 are open to the external waste via holes 306 situated respectively at the ends of the channels 308 and 309, at the outer edge of the chip body 304. The reaction chamber 303 is also open to the surrounding air with the channel 308, permitting the chamber to be more easily filled and emptied.

Thus, the second preferred embodiment illustrated in FIG. 6A relates to another special type of microfluidic chip which contains open microfluidic circuits. More specifically, again referring to FIG. 6A, instead of being connected to a waste chamber, the microfluidic circuit includes the loading chamber 301, a reaction chamber 303, and an interconnecting channel 307 as well as venting structures to the surrounding air through the channels 308 and 309, leading to the small openings 306. The opening(s) 306 are used to transfer liquids out of the reaction chamber by centrifugation. The loading chamber 301 is accessed via a loading hole 302 which receives liquids from the dispensing nozzle by dripping, as described elsewhere herein.

The hole 302 has a diameter of at least D+2E, were D is the diameter of the liquid drop and E is the imprecision in angular positioning of the microfluidic platform, both of which can be determined empirically for the specific nozzle, liquid, and platform control system.

Figure 6C:
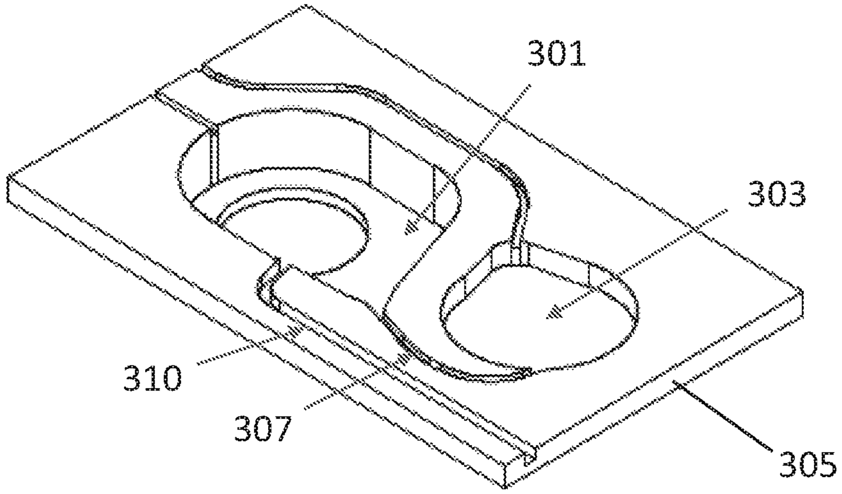
FIG. 6C illustrates a bottom perspective view of another exemplary microfluidic chip.

FIG. 6C illustrates an additional metering channel 310 which can optionally be used in conjunction with the loading chamber 301 for metering precise amounts of liquid after the loading step, which fluidly connects the loading chamber 301 with the edge of the chip. In the embodiment illustrated in FIG. 6C, the liquid receiving chamber 301 thus includes a microfluidic metering structure in the form of the large channel 310 to allow excess liquid to be sent to the waste; that is, in the event of overfilling of the chamber 301, excess fluid flows through the larger channel 310 and exits the chip. The cross-sectional area of this channel is larger than that of the channel 307 such that the flow through the metering channel 310 is order of magnitudes faster than the flow from the chamber 301 to chamber 303. When this type of chip is used, additional openings in the chip holders 201, at the proximal edge 305 of the chip, can also be provided to permit fluid from channel 310 to easily exit the chip 201 and go to the waste. These openings (opposite opening 202; not illustrated) are sized and positioned to ensure proper ejection of the excess liquid from the chamber 301 to the waste through the channel 310.

Figure 7:
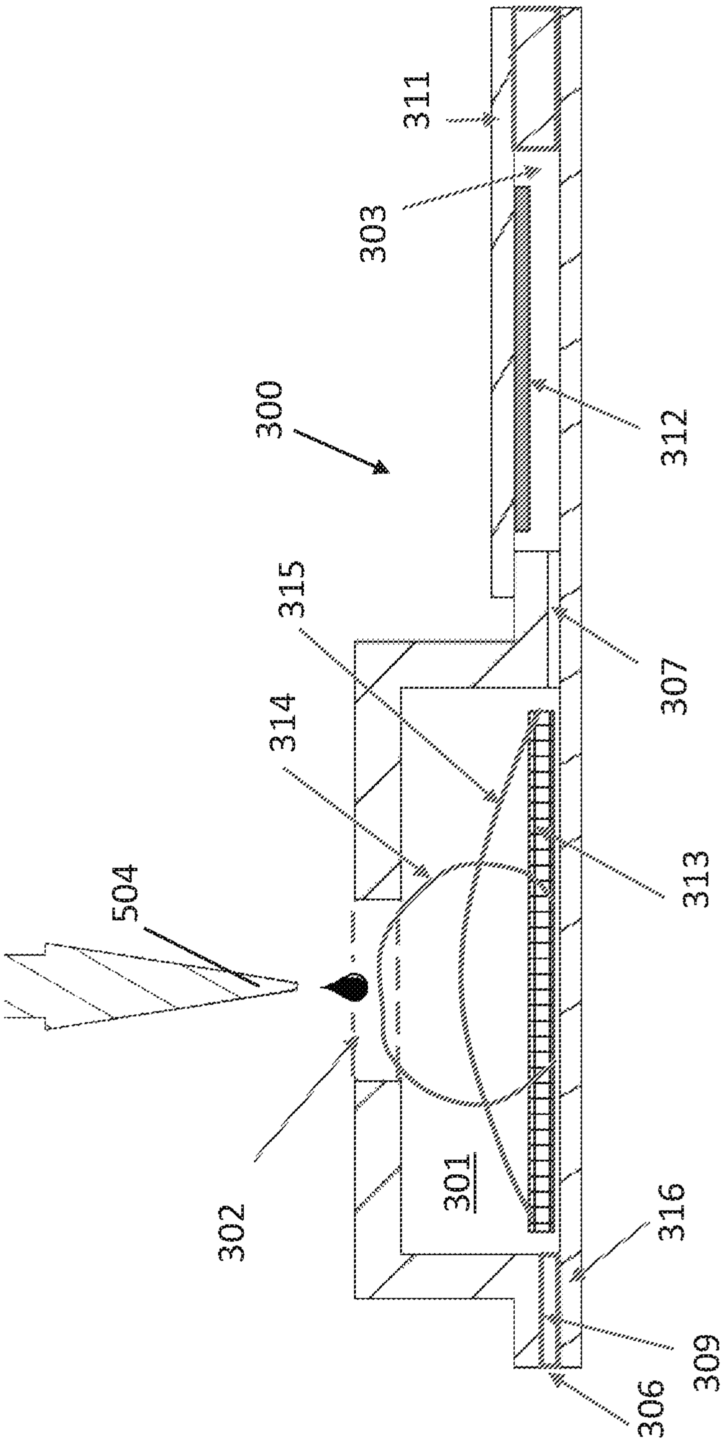
FIG. 7 illustrates a cross-sectional view of an exemplary microfluidic chip being loaded with a reagent.

FIG. 7 illustrates a cross section of an assembled microfluidic chip sealed with two flat substrates 316 and 311. The shape of an aqueous liquid droplet 314, as formed by dripping with the dispensing nozzle 504 onto a plastic device is also illustrated. Line 315 illustrates qualitatively the shape of the same droplet when micro/nanostructured substrates 313 are included in the loading chamber 301 to improve wettability in the loading chamber. By way of further example, a nanostructured material can be embossed on the floor of the loading chamber 301. Surface coatings and inserts 312 for performing biochemical assays in the reaction chamber 303 are also illustrated.

With continued reference to FIG. 7, another aspect of this preferred embodiment thus includes one or more coatings on the bottom substrate 316 of the microfluidic chip, which can include a hydrophilic coating 313, such as absorbent paper, in order to decrease the contact angle and reduce the height of the droplet (as illustrated qualitatively by the shapes 314, before coating, and 315, after). In another embodiment, the coating 313 can be in the form of a film, micro- and/or nanostructures, and/or a porous absorbent membrane. By reducing the height of the droplet, shallower loading chambers 301 can be used.

The other substrate 311, used for closing the reaction chamber 303, may also be coated directly and/or have a strip/insert 312 coated with functional biochemical material, such as an antibody.

Figure 8:
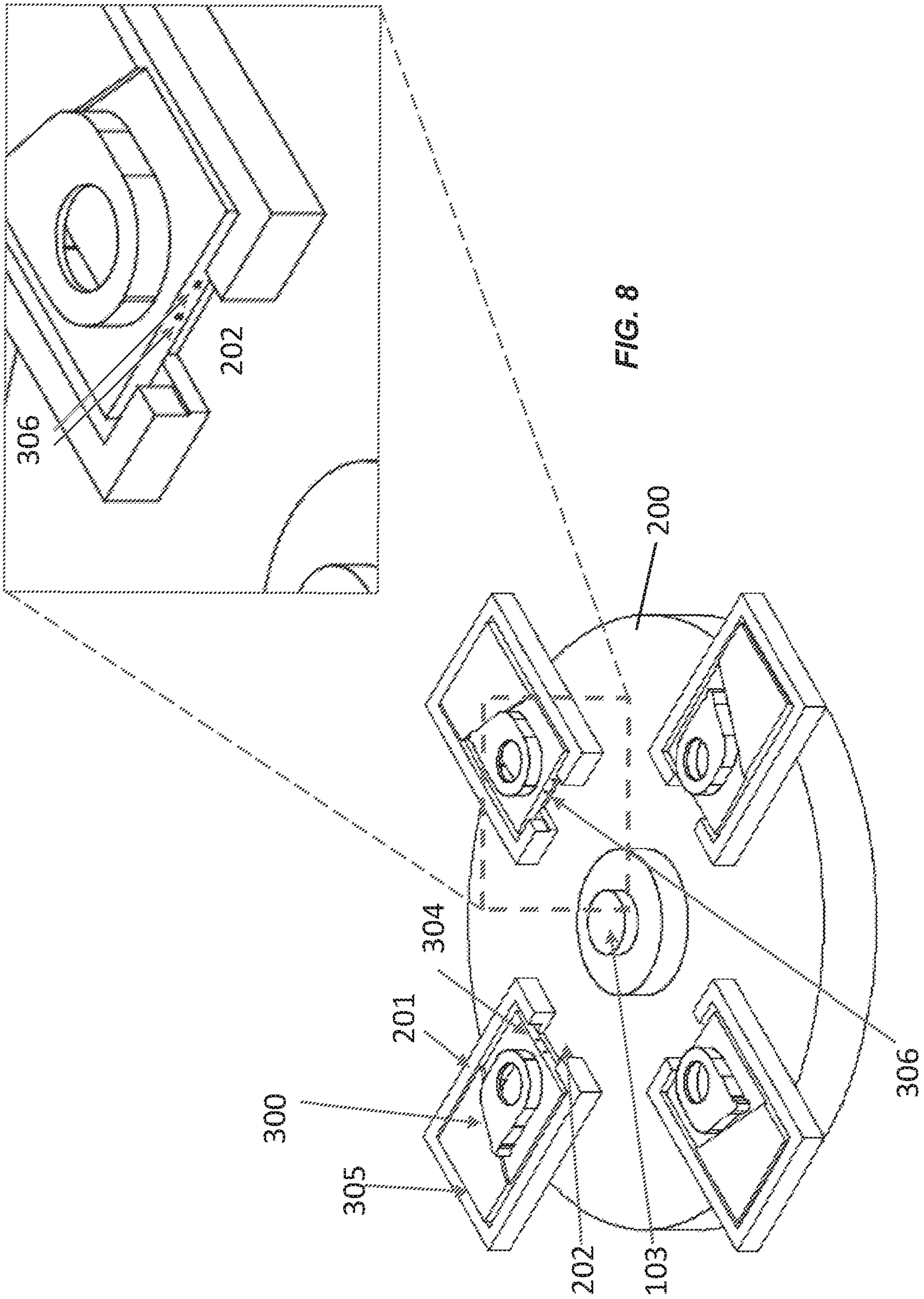
FIG. 8 illustrates a top perspective view of an exemplary rotor with chip holders and microfluidic chips loaded therein, and an enlarged view of a radially inner end of one chip holder and chip.

FIG. 8 illustrates details of the positioning of the chip 300 on the holders 201. The holes 306, opening the chip to the waste, are always matched with the slots 202 on the holders.

The microfluidic chips in FIG. 8 are placed on the rotor of the microfluidic platform in the designated holders 201 such that the channels openings 306 are on the same side with the holder openings 202 and close to the rotation center 103. In the loading mode, the motor 102 is programmed or otherwise controlled to stop and align the rotor at predefined angular positions to sequentially align the dispensing nozzles (not illustrated in FIG. 8) with the loading holes 302 of the chips. When the liquid pumping system is activated, droplets of liquid formed at the tip of the dispensing nozzle fall successively into the loading chambers 301. This regime will be referred to herein as the “loading mode”. By setting the pumping time, the volume of liquid to be transferred to the loading chamber is metered through the flow rate of the pump with a precision of ±v, where v is the volume of an individual droplet.

After a specific reagent liquid has been consumed or used in the reaction, the holders 201 are oriented at 180 degrees with the openings 306 and openings 202 pointing toward the waste and the platform starts spinning at a specific angular speed in order to push the liquids towards the openings 306 and transfer the liquid into a waste reservoir 400.

Figure 9:
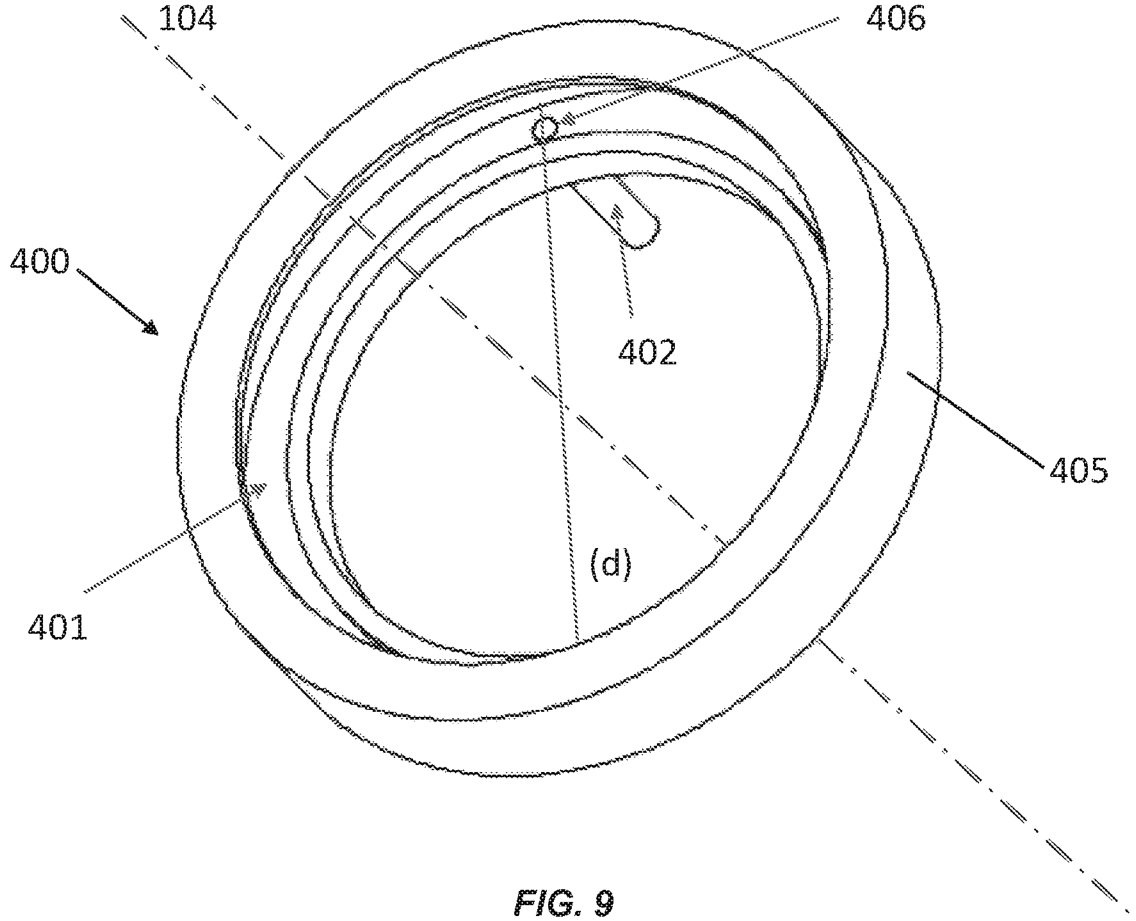
FIG. 9 illustrates a top perspective view of an exemplary waste collector.
Figure 10A:
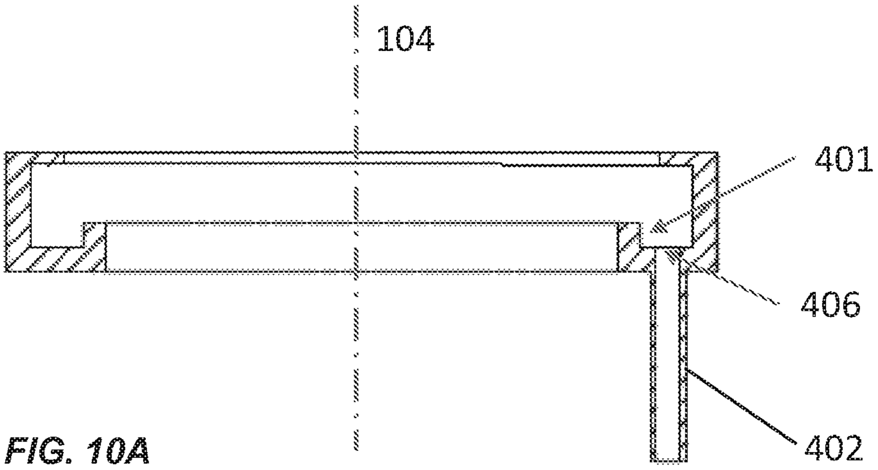
FIGS. 10A-B illustrate vertical cross-sectional views of the waste collector of FIG. 9.
Figure 10B:
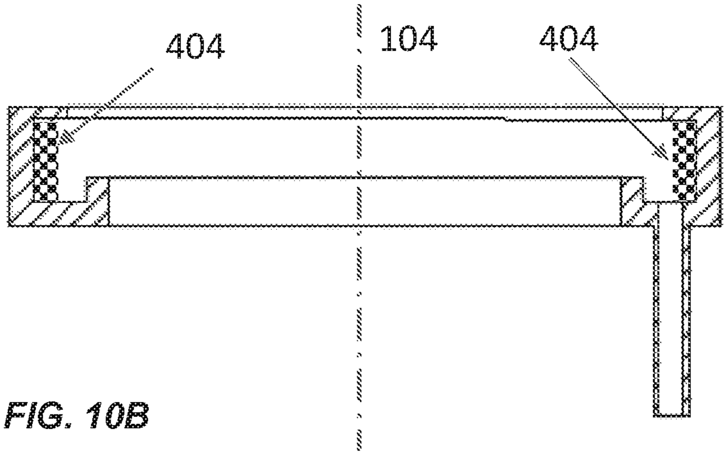

FIGS. 9-10B respectively illustrate 3D and cross-section views of the annular-shaped stationary waste channel 401 formed in the waste collector body 405 with the outlet tube 402 connected to a hole 406 formed in the body, preferably in its bottom so the fluid flows by gravity. Liquid absorbent material 404 can optionally also be included in the channel 401, e.g., on a radially outer wall defining the channel, as shown in FIG. 10.

In a first exemplary embodiment, the waste reservoir is part of the instrument case, as a stationary ring with a cavity to collect the waste and direct it to the hole 402 and a collection tube 403 (e.g., FIG. 9). FIGS. 10A and 10B illustrate cross-sectional views of the waste through the plane defined in FIG. 9 by the main rotation axis 104 and the diameter line (d). As illustrated in FIG. 10B, structures can optionally be provided to inhibit and/or prevent back spilling to the chip and/or splashing as liquid is ejected from the chip; by way of non-limiting examples, an absorbent material 404 can optionally be inserted into the waste channel 401, and/or baffles and/or angled walls can be formed at the radially outer portions of the channel, to direct the fluid waste away from the chip and toward the hole 406.

Figure 11A:
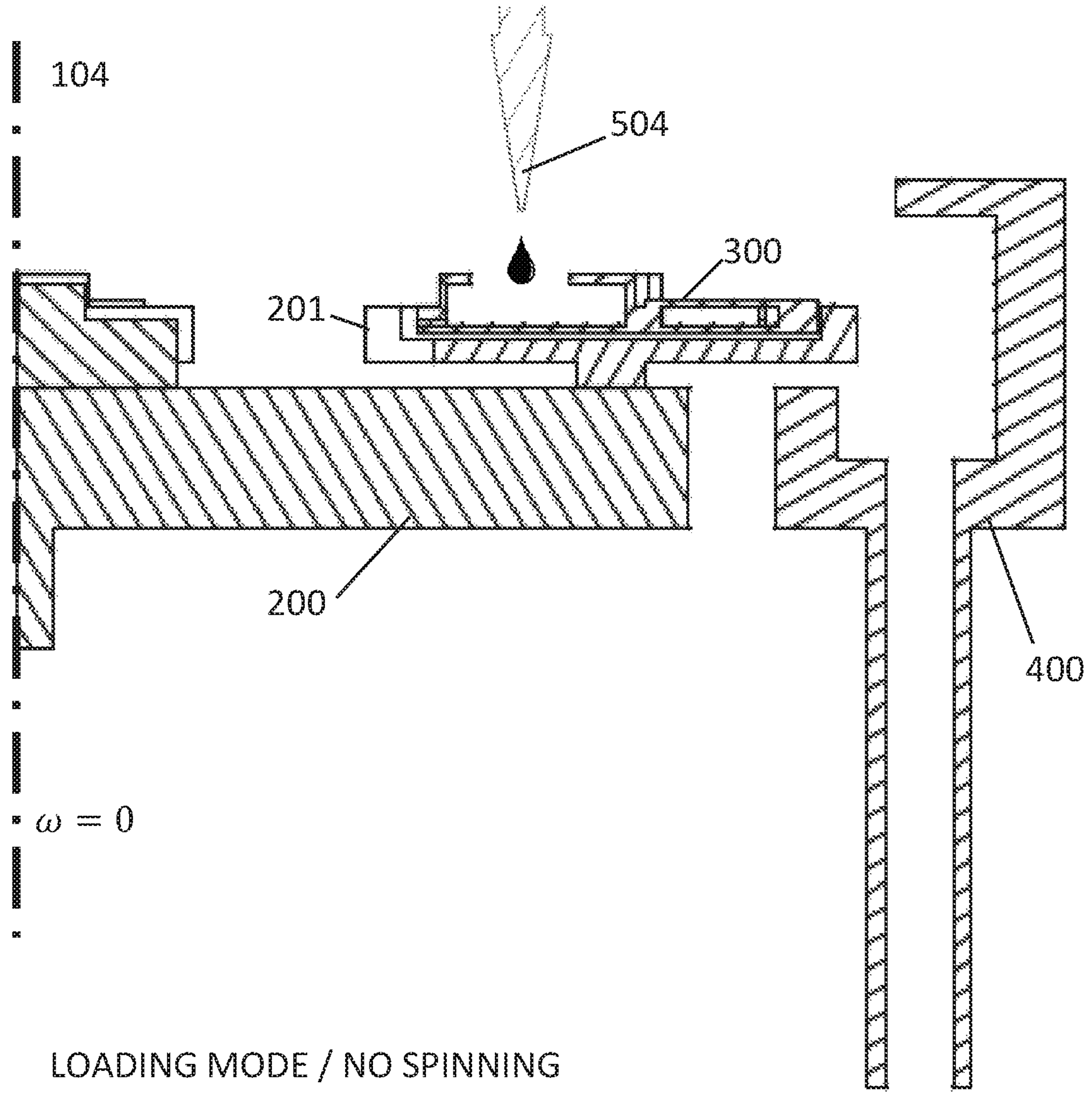
FIGS. 11A-B illustrate vertical cross-sectional views of a rotor, chip holder, chip, and waste collector in loading and unloading orientations.

FIG. 11A illustrates a half cross-sectional view of the rotor 200, the holders 201, and the waste 400 in the loading mode. The chip 300 is fed with liquid from nozzle 504 through the loading hole 302. In this position, the holder 201 is oriented with the openings 202 towards the rotation center 104.

Figure 11B:
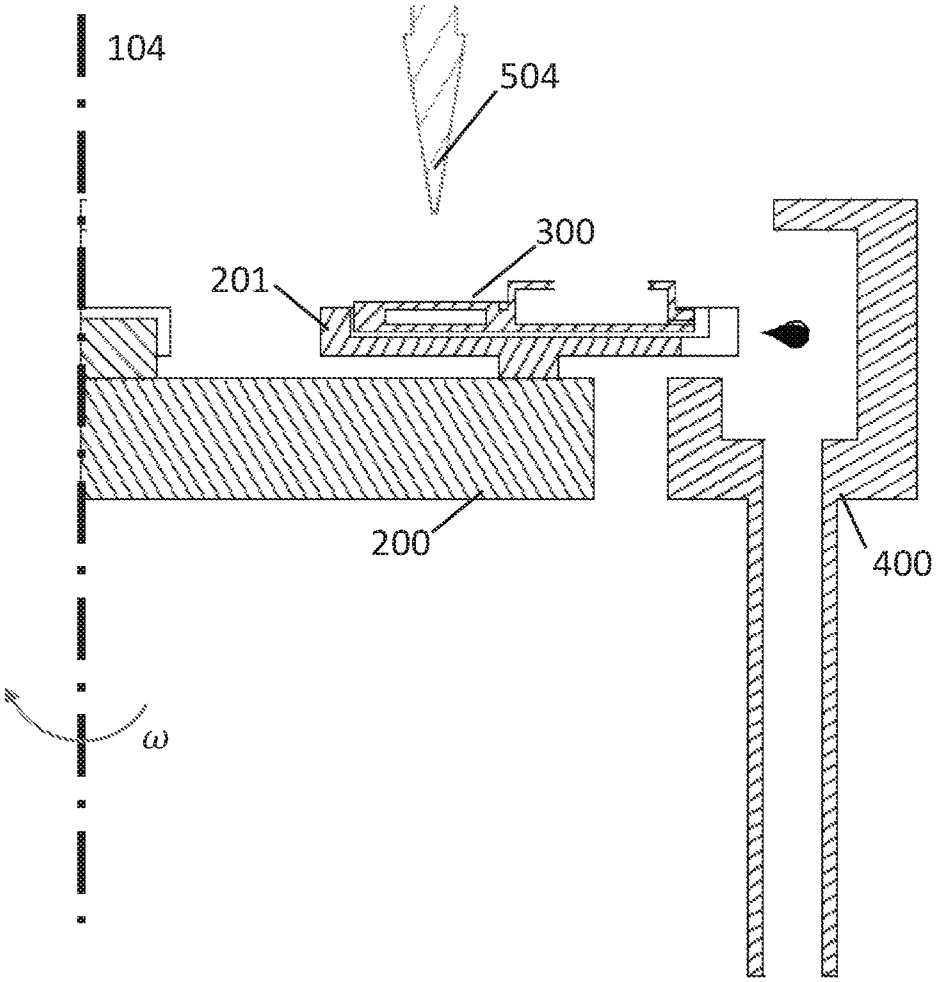

FIG. 11B illustrates a half cross-sectional view of the rotor 200, the holders 201, and the waste 400, in which the chip 300 is in the unloading mode. In this position, the holder 201 is oriented with the openings 202 away from the rotation center 104, towards the waste 400.

Thus, cross-sectional views of the complete assembly of the platform, including the rotor 200 with holders 201, the microfluidic chip 300, and the stationary waste 400, are illustrated in FIGS. 11A and 11B. FIG. 11A illustrates the loading mode, when the rotor is at rest and the microfluidic chip loading chamber is aligned with the dispensing nozzle (s) in order to transfer liquids/reagents from external stationary reservoirs to the chip. FIG. 11B illustrates the positioning of the chip holders in the rotating, unloading mode, when liquids are expelled from the chip to the stationary waste 400. This process is illustrated with more detail in FIGS. 12A-12C.

Figures 12A, 12B, 12C:
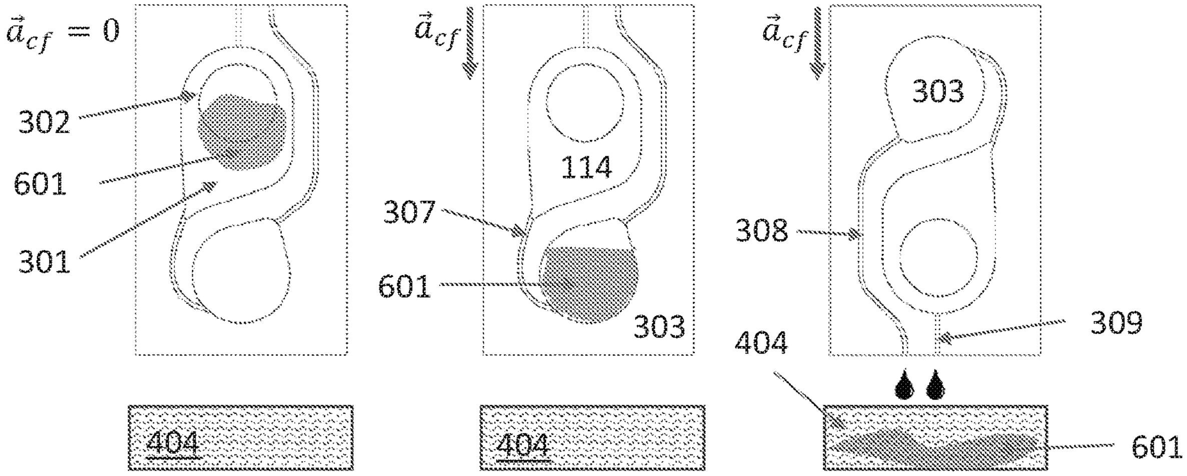
FIGS. 12A-C schematically illustrate three stages of use of an exemplary microfluidic chip.

FIGS. 12A-12C qualitatively illustrate three modes for the microfluidic chip 300 on a microfluidic platform described elsewhere herein: (i) FIG. 12A illustrates a loading mode, in which a liquid 601 is transferred from the dispensing nozzle to the loading chamber 301; (ii) FIG. 12B, a reaction mode after transferring the liquid 601 from the loading chamber 301 into the reaction chamber 303 via the microfluidic channel 307; and, (iii) FIG. 12C, an unloading mode, in which the holder (with the chip 300 on it) is rotated 180 degrees with respect to the secondary rotation axis and the liquid 601 exits the chip at holes 306 via channels 308, 309, and is sent to the waste 400, here illustrated with the absorbent material 404.

After the introduction of liquid 601 through the hole 302, the liquid is found in an indeterminate configuration in the loading chamber 301. When the platform starts spinning, the liquid 601 is transferred through the channel 307 (FIGS. 6B-7) into the reaction chamber 303 to perform a specific step in the assay protocol. After the reaction step completed, the chip 300 is reoriented 180 degrees to point the opening of the chip 306 towards the waste reservoir 401. Spinning at relatively high speed will send the liquids from the chip to the waste through the channels 308 and 309.

Figure 13A:
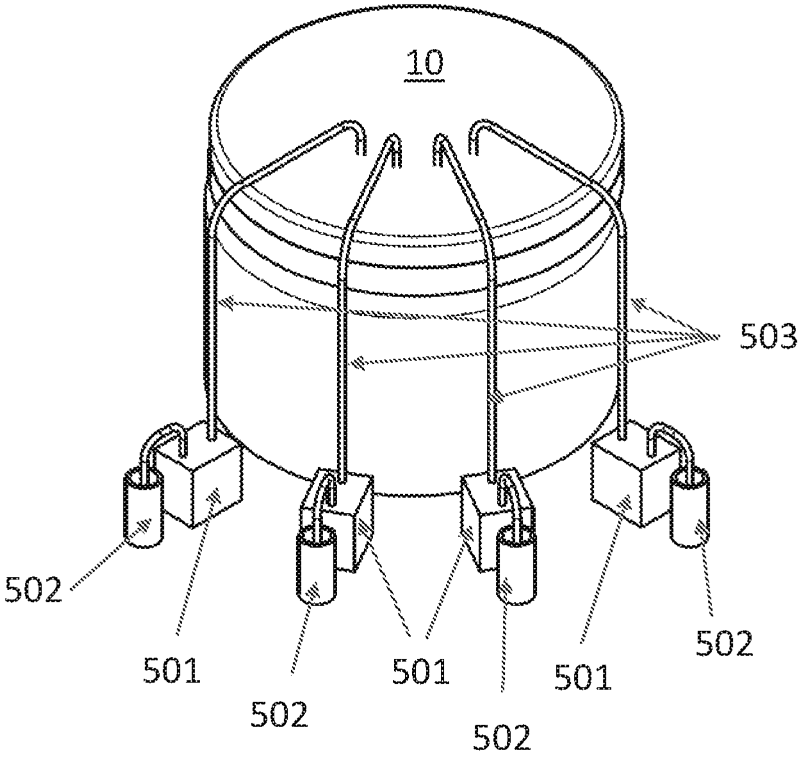
FIG. 13A illustrates another exemplary embodiment of a centrifugal microfluidic platform system.

FIG. 13A illustrates another exemplary embodiment which includes a centrifugal microfluidic platform in which a plurality, here four, of liquid reagents are transferred through a world-to-chip interface 10. Each reagent reservoir 502 is provided a separate coupling tube 503, pump 501, and nozzle 504, one for each liquid reagent. One or more controllers (not) illustrated control the operation of the pumps 501.

Figure 13B:
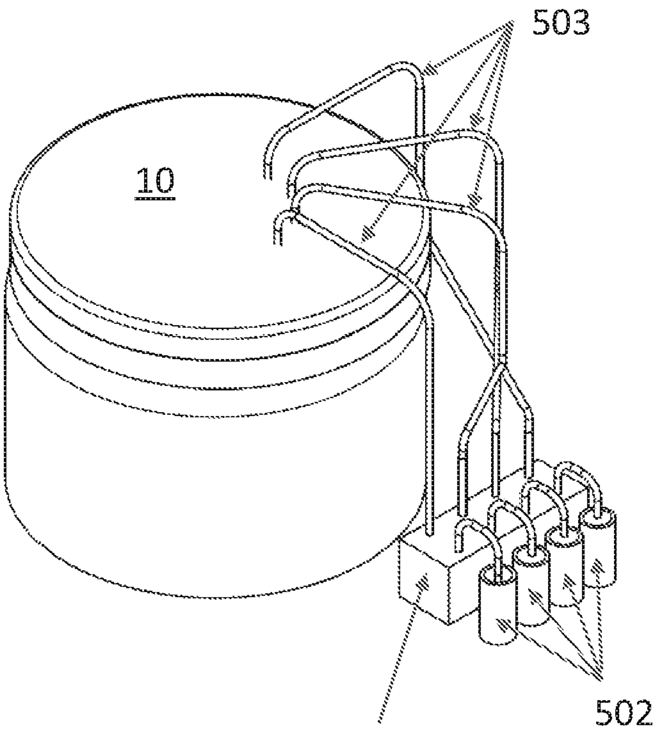
FIG. 13B illustrates yet another exemplary embodiment of a centrifugal microfluidic platform system.

FIG. 13B illustrates yet another exemplary embodiment of a centrifugal microfluidic platform 10, in which a plurality, here four, of liquid reagents are transferred through a world-to-chip interface, and in which the reagent reservoirs 502 are provided their own coupling tubes 503 and nozzles, but a single pump 501.

Figure 13C:
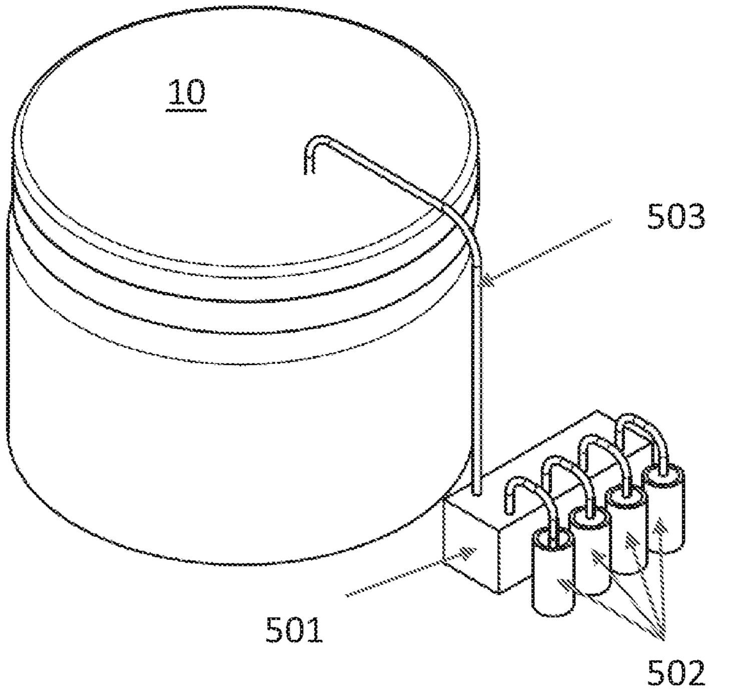
FIG. 13C illustrates a further exemplary embodiment of a centrifugal microfluidic platform system.

FIG. 13C illustrates yet another exemplary embodiment of a centrifugal microfluidic platform in which a plurality, here four, of liquid reagents are transferred through a world-to-chip interface, and in which each reagent reservoir 502 is provided with a dedicated coupling tube to a pump single 501, but a single tube 503 and nozzle 504 leads to the centrifugal platform for all reagents. Hybrids of the embodiments of FIGS. 13A-13C can also be used, e.g., some reagents with a dedicated pump, with other reagents sharing a pump; and some reagents having a dedicated tube and nozzle, with other reagents sharing a tube and a nozzle.

It can be particularly advantageous to use an embodiment in which each liquid necessary for the performed assay is pumped into the chip by using individual liquid pumping units, as illustrated in FIG. 13A. Each unit contains its own tubing 503, such that fluidic paths are completely separated. The pumps in this embodiment can be peristaltic pumps which are connected with the inlets to the stationary reagent reservoirs 502 and the outlets to the liquid reservoirs. The peristaltic pumps can be packed together in a single pumping unit as illustrated in FIG. 13B.

In another embodiment, the pumping system can be provided with one or more valving mechanisms which selectively direct all the inlets to one single outlet 503, as illustrated in FIG. 13C, which can be under manual or automatic control.

Figure 14A:
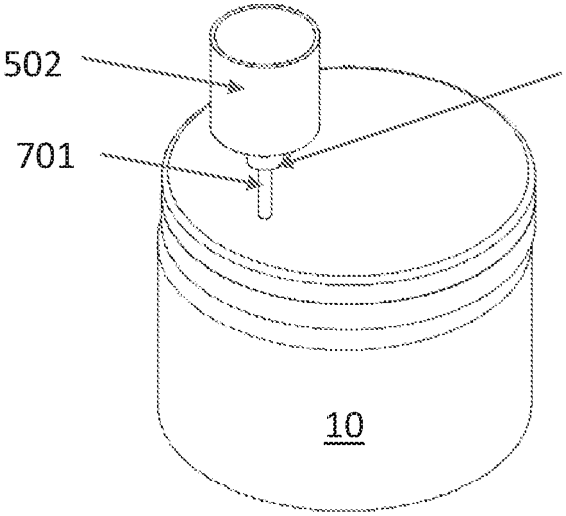
FIGS. 14A-D illustrate views of yet another exemplary embodiment of a centrifugal microfluidic platform system.
Figure 14B:
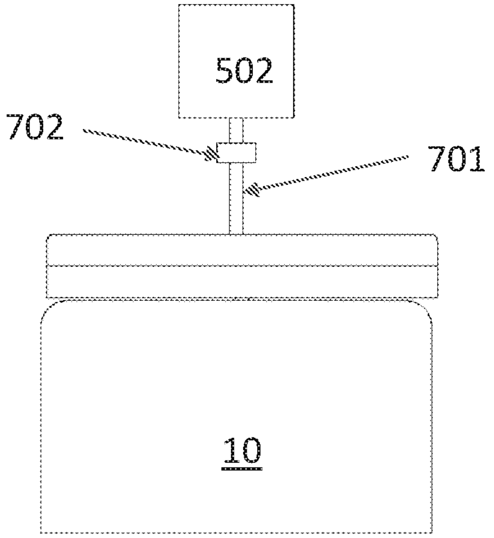
Figure 14C:
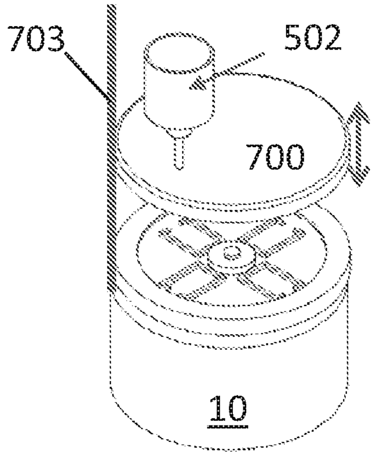
Figure 14D:
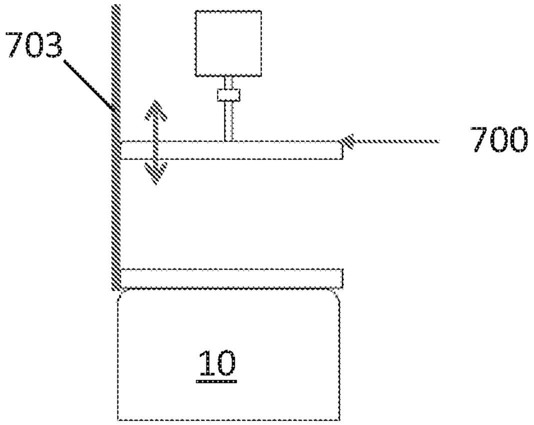

FIGS. 14A-14C illustrate an exemplary embodiment of a centrifugal microfluidic platform 10 in which liquid reagents are placed in a reservoir 502 located above a cover lid 700, and the liquids are pushed either by gravitational action or pneumatically towards the dispensing nozzle through a tube 701. The liquid flow is controlled with the help of an electromechanical valve 702, which can be under manual and/or automatic control. The cover lid 700 can eventually open vertically with the help of a slider 703, as suggested in FIGS. 14C and 14D.

Thus, in this exemplary embodiment, the pumping system is mounted directly on the lid 700 of the platform 10, and the tubing 701 connecting the dispensing nozzle to the liquid reservoir 502 is coupled through an electromechanical valve 702. The cover lid 700 slides up and down using one of several sliders 703 to allow access to the platform rotor. The liquid can be transferred from the liquid reservoir(s) 502 to the dispensing nozzle by gravitational action.

In another embodiment, the liquid pumping system is based on pneumatic actuation, where the liquid is extracted and transferred to the microfluidic chips by pressurizing the reservoirs 502. An electromechanical valving 702 system controlled by the electronic control unit 102 can be used to synchronize the valves with the pneumatic actuation protocol and the assay performed on the microfluidic chip. In this pneumatically driven embodiment, one or more gas lines is (are) connected to the reservoir(s) 502, which introduce air or another gas into the open headspace of the reservoir, thus pressurizing the reservoir; upon opening of the valve 702, the fluid in the reservoir 502 is driven into the tube 701 and into the chip, as described elsewhere herein. While air is a preferred gas to use in this embodiment, other gases or mixtures of gases can be selected, particularly those which do not react with the liquid being delivered to the chip.

Figure 15:
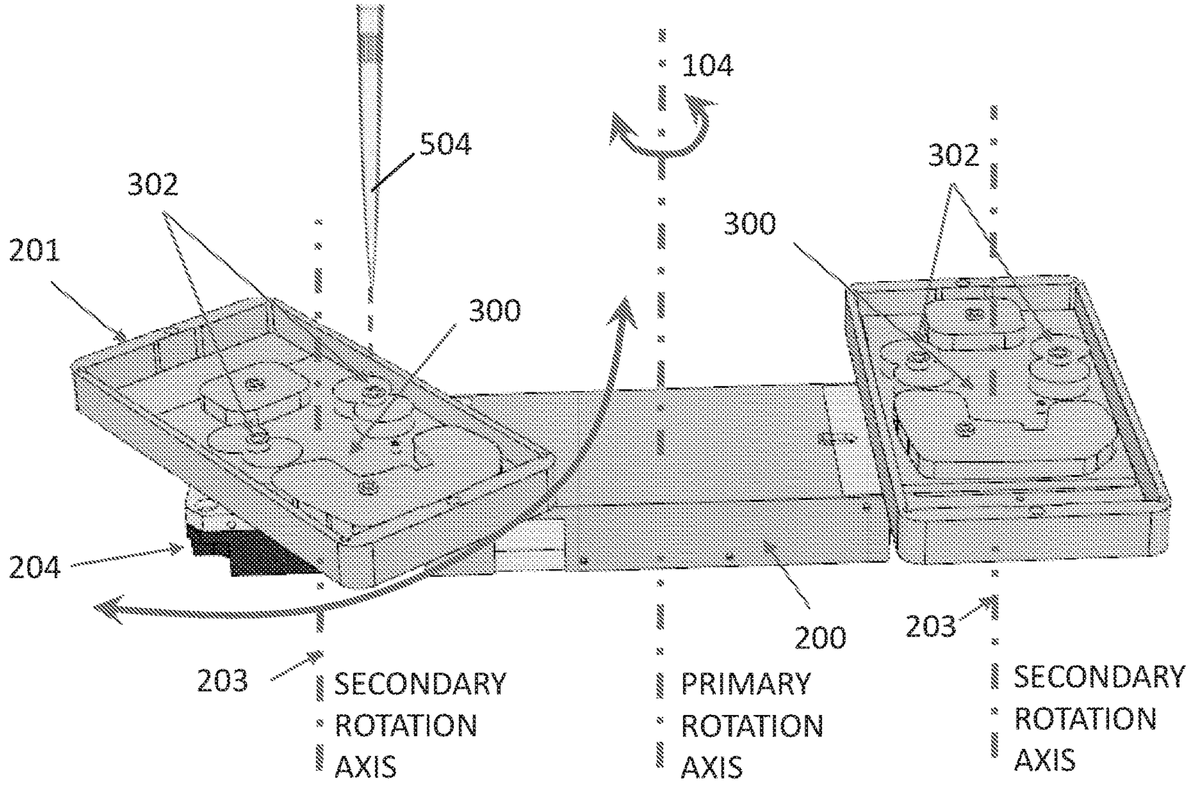
FIG. 15 illustrates a top perspective view of a rotor and chip holders retaining yet another exemplary embodiment of a microfluidic chip with multiple loading chambers.

FIG. 15 illustrates a rotor 200 of an articulated centrifugal microfluidic platform, such as that disclosed in WO 2015/181725, provided with an additional degree of freedom for the microfluidic chip holders 201 in the form of a secondary rotation axis 203. FIG. 15 also illustrates the positioning of the dispensing nozzle 504 with respect to one of the feeding holes 302 of the loading chambers.

In accordance with yet another embodiment, microfluidic chips can be constructed with more than one, that is, several loading chambers, as depicted in FIG. 15. The microfluidic chips 201 are mounted on an articulated microfluidic platform and the alignment of different loading chambers with the same feeding nozzle is achieved by taking advantage of additional degrees of freedom, including the secondary rotation axis 203 in FIGS. 4A and 4B, enabled by this type of articulated centrifugal platforms.

Figure 16A:
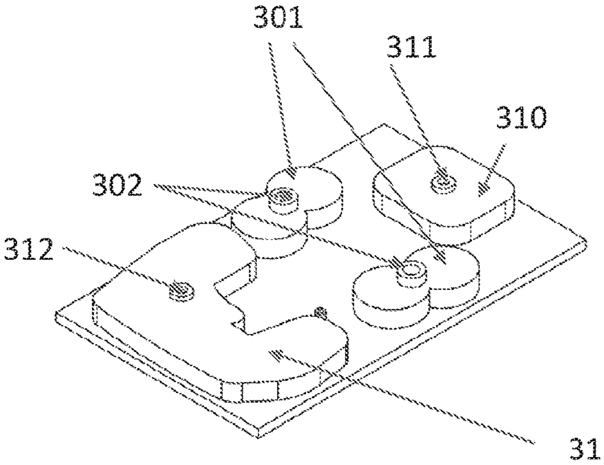
FIGS. 16A-B illustrate top and bottom, respectively, perspective views of the microfluidic devices installed on the holders in FIG. 5, as an exemplary chip with multiple loading chambers.
Figure 16B:
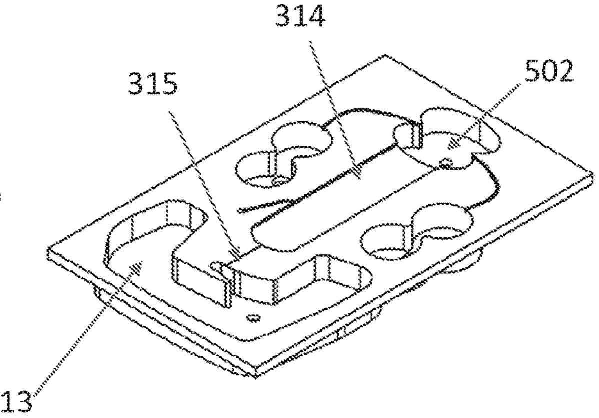

FIGS. 16A and 16B detail an exemplary design of a microfluidic chip (top and bottom views, respectively) with two loading chambers 301, each having a loading hole 302, and a waste reservoir 313 integrated into the chip. The chip includes an intermediate chamber 502 (FIG. 16B) for transferring the liquid from the loading chambers 301 to the reaction chamber 314, via channels connecting the chambers. The transfer of liquid from the reaction chamber 314 to the waste 313 is realized via channel 315. FIGS. 16A, 16B exemplify such a microfluidic chip with two loading chambers 301 and two loading holes 302 connected to the reaction chamber 314 through and intermediate transfer reservoir 502, but chips with more than two sets of loading chambers and loading holes can also be provided in the chip. Similar to other embodiments described herein, the chambers can be completely contained in the chip body, or extend away from the body with upstanding walls.

Figure 17A:
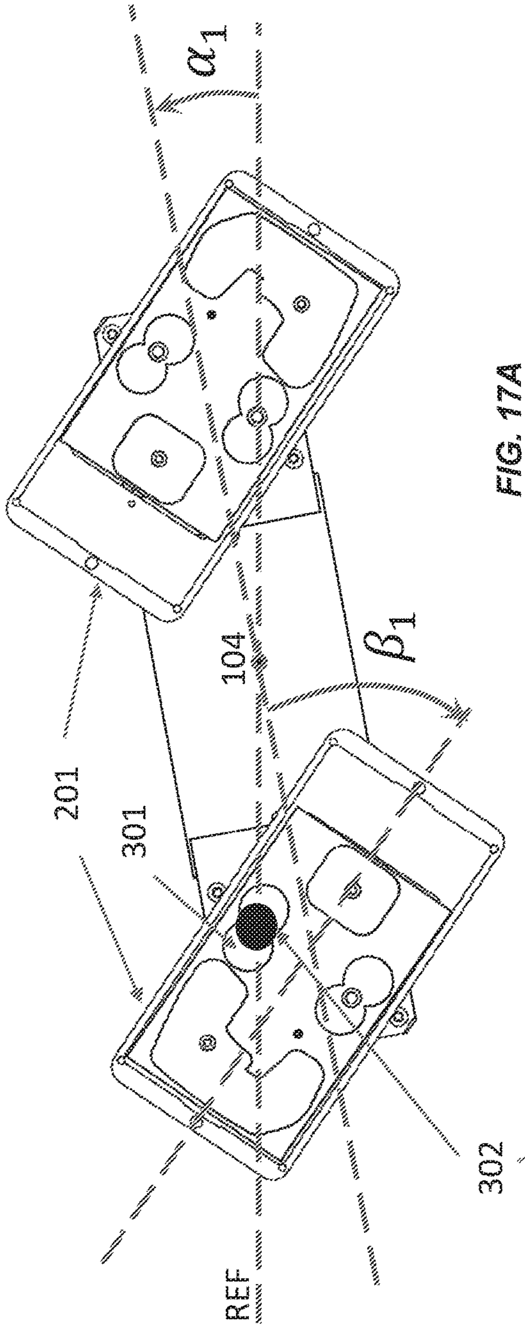
FIGS. 17A-17B illustrate top plan views of a rotor with the chips of FIG. 15 in two different loading orientations.
Figure 17B:
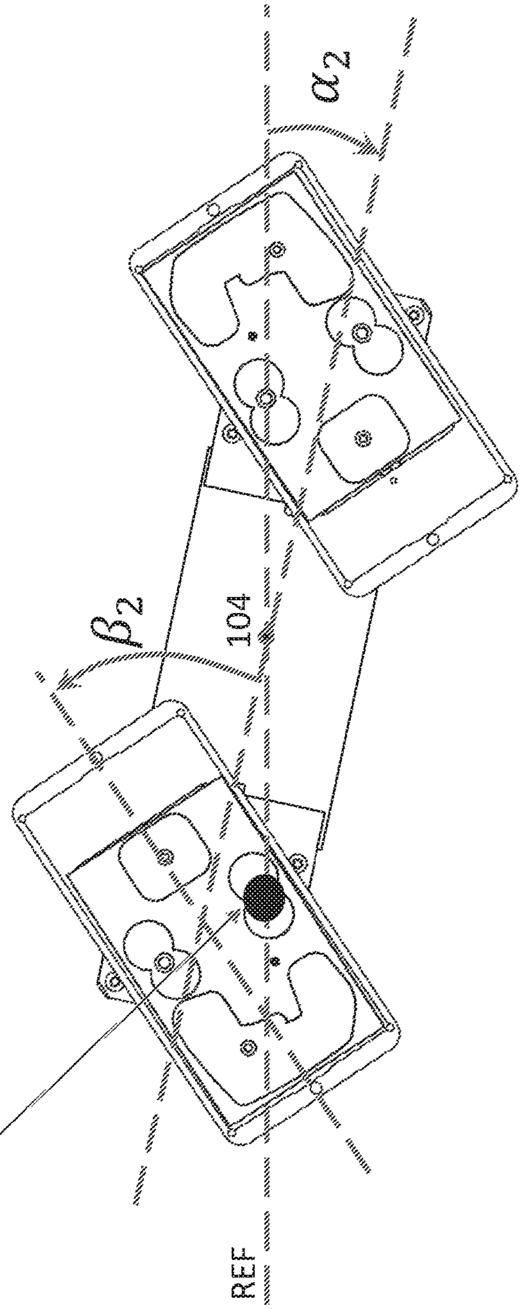

FIGS. 17A and 17B schematically illustrate the use of the two degrees of freedom in an articulated centrifugal platform (see, e.g., WO 2015/181725) for aligning a dispensing nozzle 504 with the loading holes 302 of the loading chambers 301, for a chip that includes more than one loading hole. More specifically, FIGS. 17A and 17B illustrate that loading chambers 301 at different positions on the microfluidic chip can be addressed individually by the same dispensing nozzle by aligning the main rotor and chip holder at respectively different angular positions α and β. FIGS. 17A and 17B qualitatively illustrate the two configurations for the articulated microfluidic platform for the microfluidic chip to align its two loading chambers with the same nozzle. The two loading holes are addressed by the two angular positions (α1,β1) and (α2,β2).

Figure 18A:
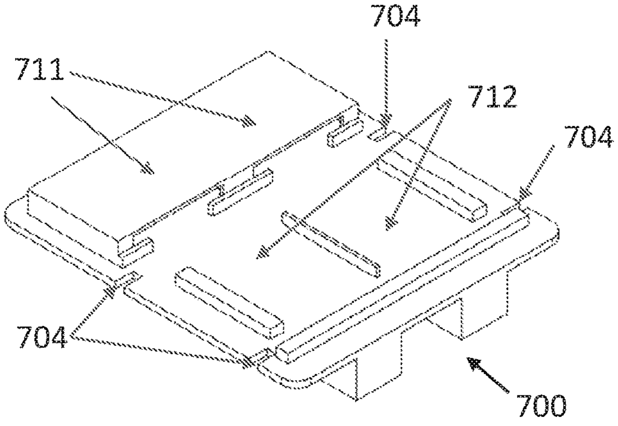
FIGS. 18A-B illustrate top perspective views of another exemplary embodiment of a chip holder.
Figure 18B:
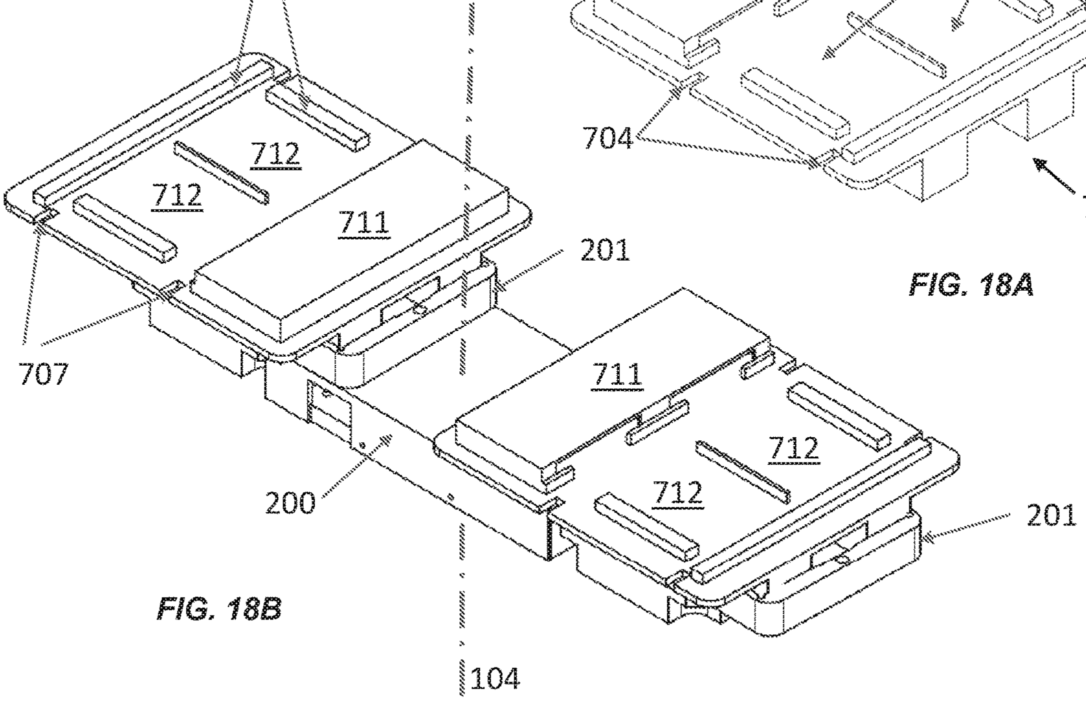

FIGS. 18A and 18B illustrate yet another exemplary embodiment which includes an articulated microfluidic platform, in which a waste reservoir 711 is moved outside the chip and installed on the chip holder 201. Although FIGS. 18A and 18B illustrate only two chips per holder, more than two microfluidic chips can be secured in the slots 712 with strips anchored through specially designed slots 707 or another mechanism.

More specifically, in the embodiment of FIGS. 18A and 18B, the waste reservoir 711 is positioned outside and separate from the microfluidic chip, but on the articulated microfluidic platform rotor 200. The microfluidic chips are mounted on holders at specific locations 712 and with integrated waste reservoirs 711. These holders are coupled with the secondary motors 204 and thus they are rotated about a secondary axis, as described elsewhere herein, such as with reference to FIG. 2B. The waste reservoirs 711 can be filled with absorbent material and positioned as close as possible from the primary rotation axis 104, to inhibit the back spill of waste liquid from the waste reservoir into or onto the chip.

Figures 19A, 19B, 19C:
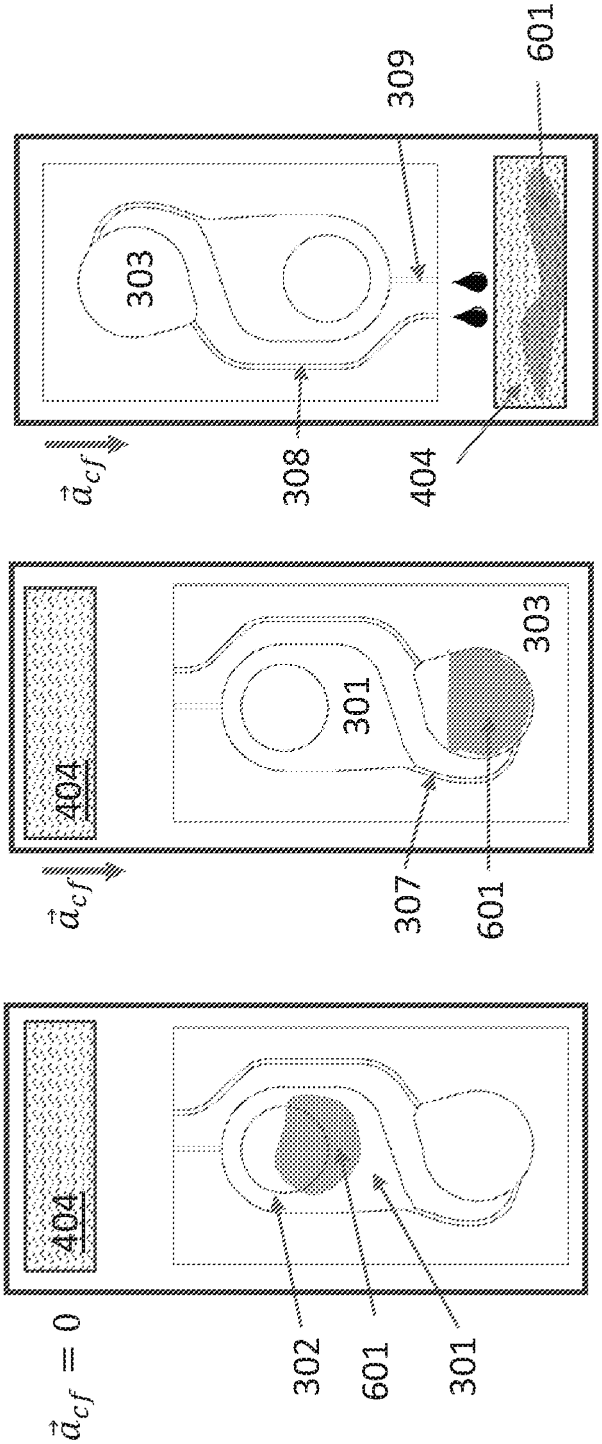
FIGS. 19A-C schematically illustrate three stages of use of yet another exemplary microfluidic chip.
Figure 20:
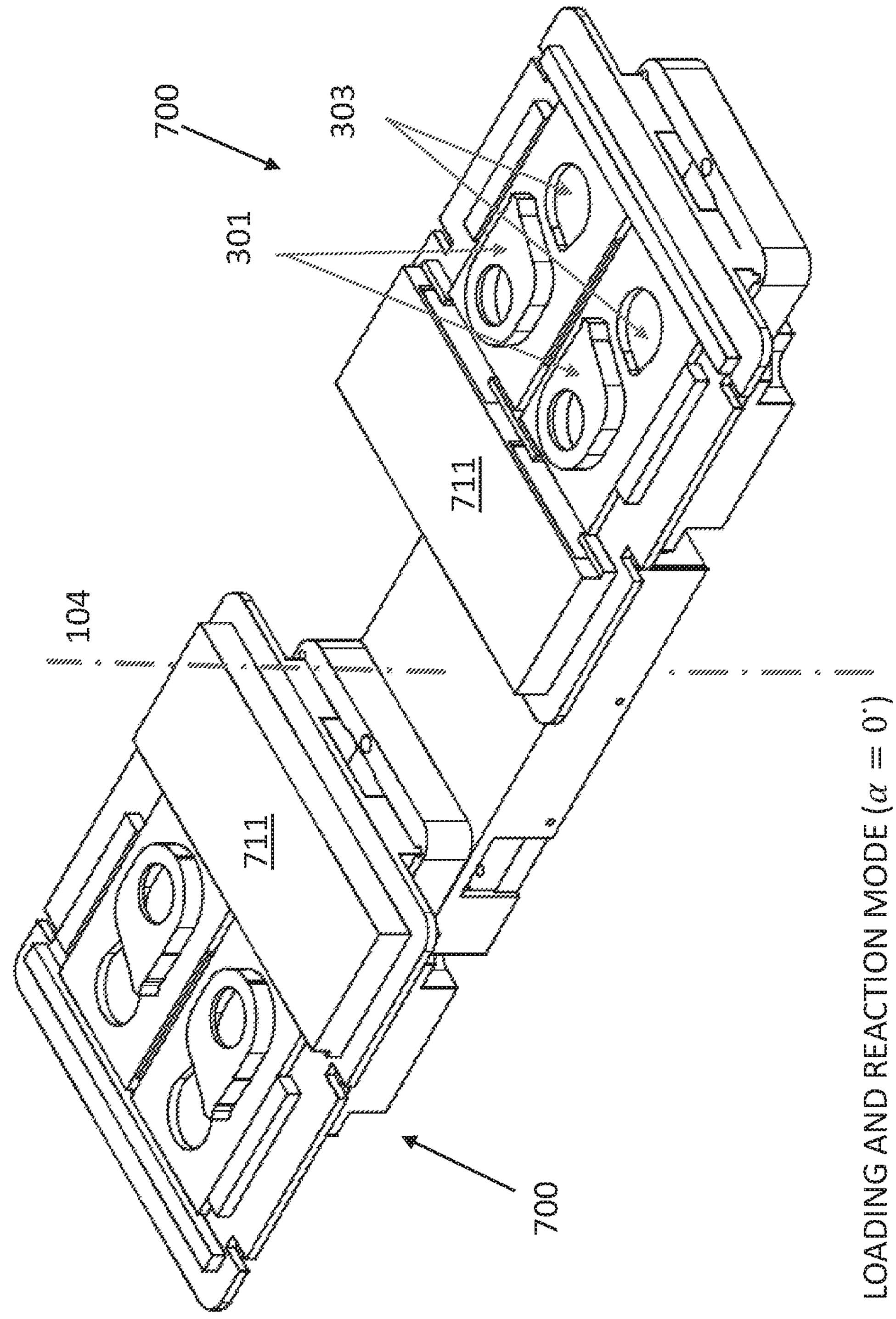
FIG. 20 illustrates a top perspective view of the chip holder of FIGS. 18A-B, holding microfluidic chips in a first orientation.
Figure 21:
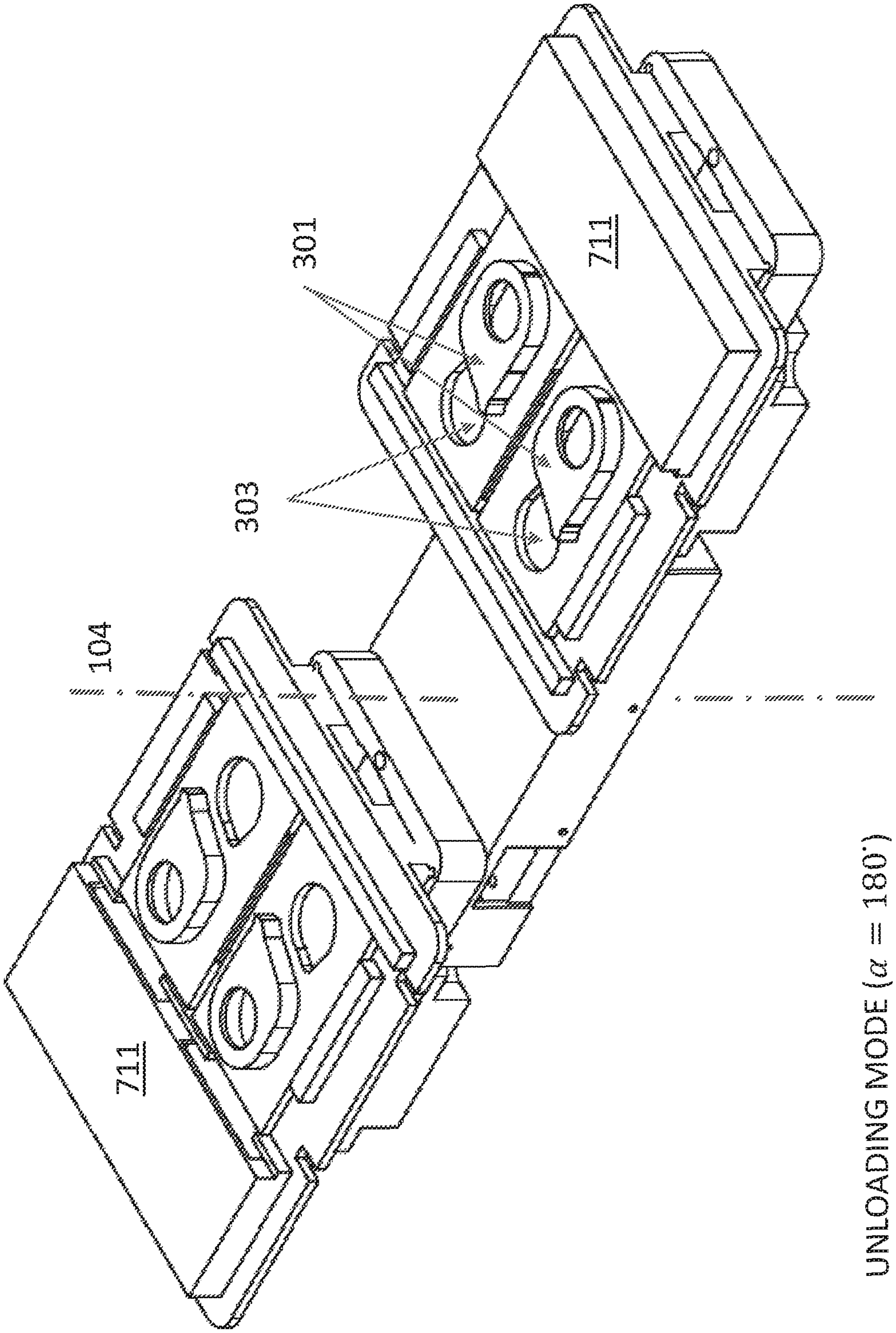
FIG. 21 is a view similar to that of FIG. 20, holding microfluidic chips in a second orientation.

FIGS. 19A-19C qualitatively illustrate the three modes (loading, reaction, and unloading) for embodiments in which waste reservoirs are provided on the articulated holders of the platform. The waste reservoir (here, designated with absorbent 404) is positioned close to the rotation center in the loading and reaction modes (above the top of FIGS. 19A, 19B) and the away from the rotation center in the unloading mode (FIG. 19C). As shown in FIGS. 19A-19C, in loading and reaction modes, the holders are oriented such that the waste is very close to the rotation center. In the unloading mode, the holder (with chip and waste on it) is rotated 180 degrees and the liquid is expelled through channels 308 and 309 and into the waste reservoirs 711. The configuration of the holders with the chips in the two positions (reaction and unloading modes, respectively) is also depicted in FIGS. 20 and 21.

Figure 22:
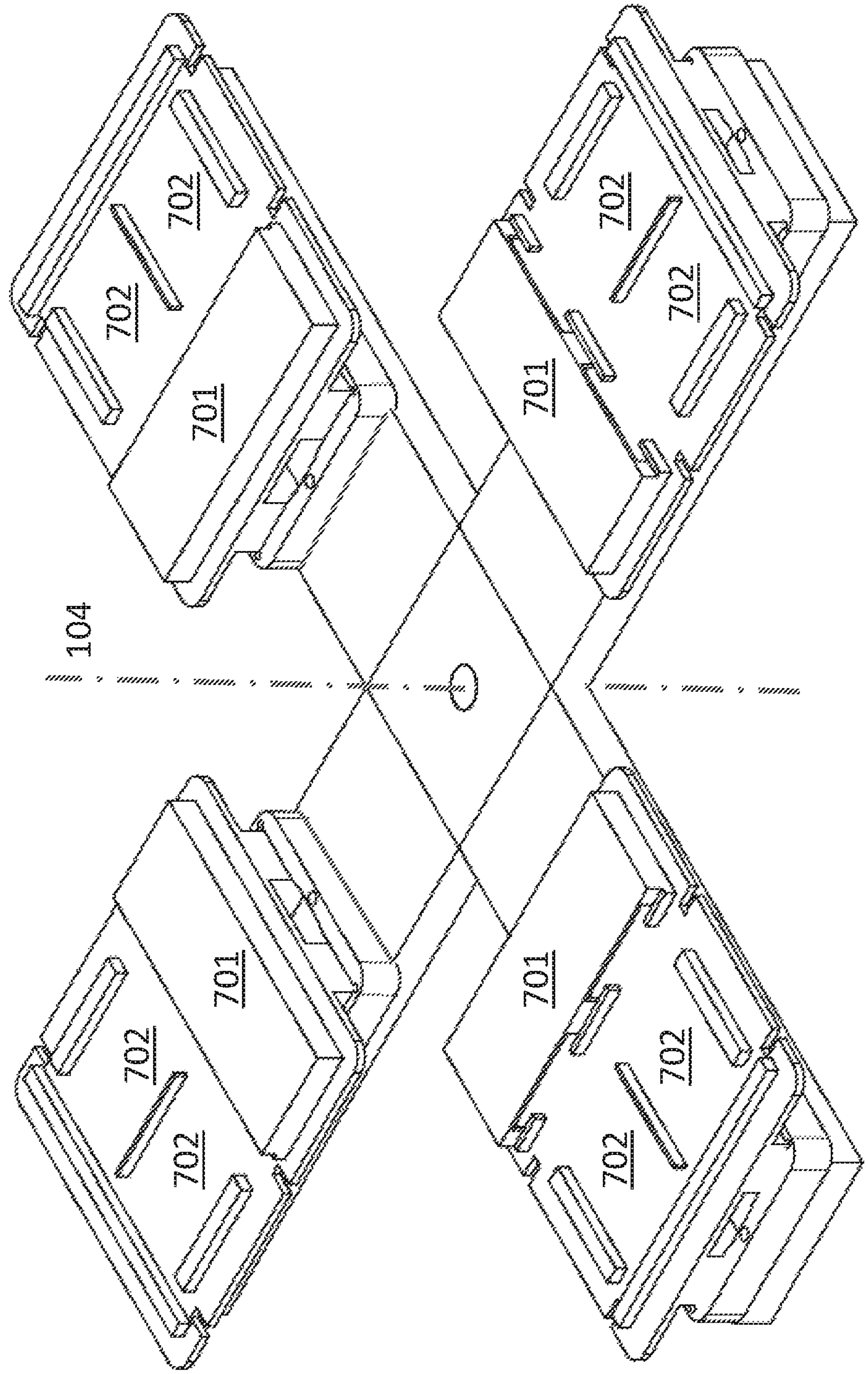
FIG. 22 illustrates a top perspective view of a rotor with four sets of chip holders.

To increase throughput, rotors with multiple holders can be constructed, as illustrated in FIG. 22, which illustrates an exemplary example of a rotor in an articulated centrifugal platform with four, two-chip holders.

In yet another exemplary embodiment, the waste cavities 711 on the microfluidic chip holders include multiple interconnected chambers and channels or multilevel three-dimensional structures to take advantage of both centrifugal force and gravity and send liquids irreversibly into a waste collection reservoir.

Figure 23A:
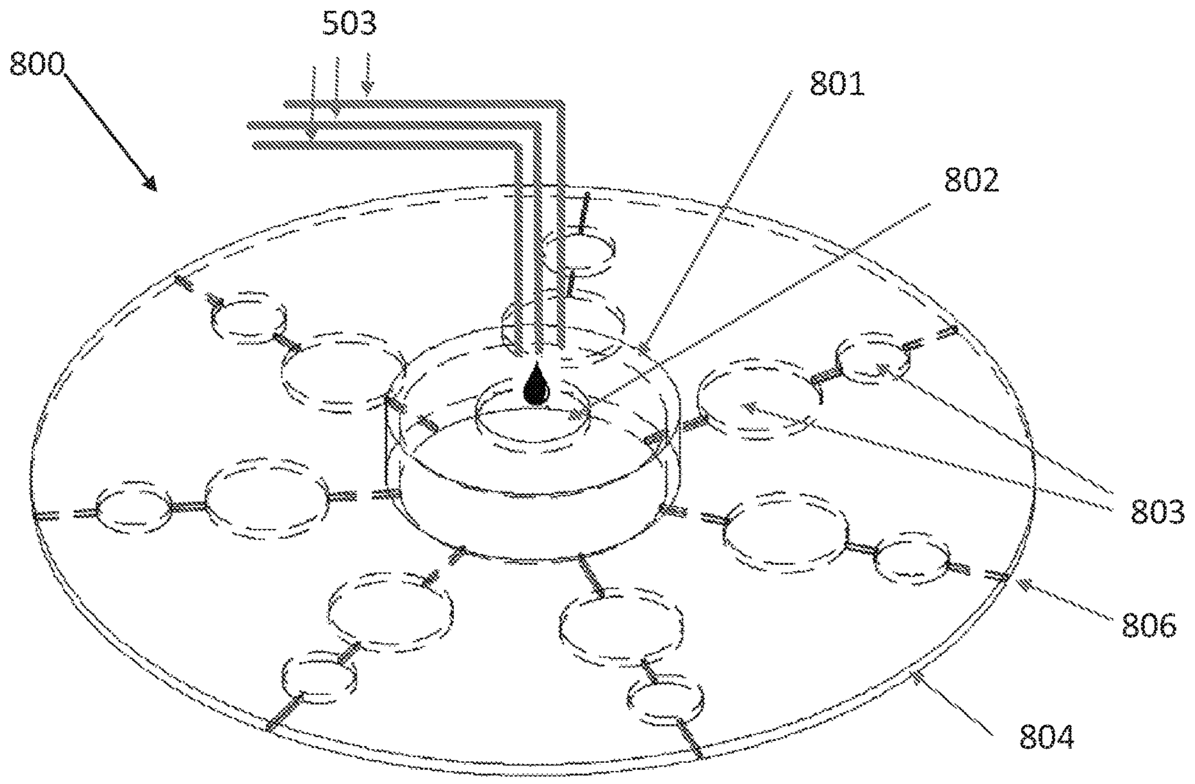
FIG. 23A illustrates a top perspective view of yet another exemplary microfluidic chip in disk form.

FIG. 23A illustrates an exemplary centrifugal microfluidic platform in which the microfluidic chip, described elsewhere herein, is replaced with a microfluidic disc 800 having a central loading chamber 801 and a large loading hole 802, such that several dispensing nozzles 503 can transfer liquids to the chip. The loading chamber 801 is fluidically connected to one or several microfluidic circuits, as otherwise described herein. The disc 800 is also opened to the air with openings 806 at its edge in order to eject liquids to an external stationary waste, such as waste 401.

Figure 23B:
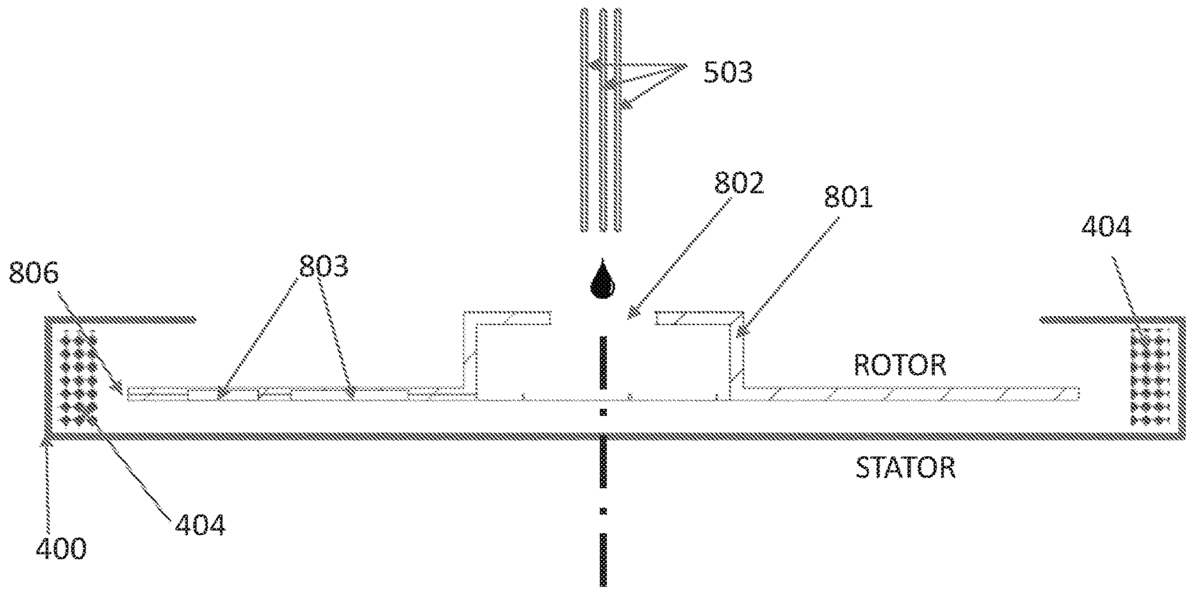
FIG. 23B illustrates a vertical cross-sectional view of the disk chip of FIG. 23A positioned on a rotor, within a waste collector, in an exemplary use.

The loading chamber 801 is positioned at the center on the rotation axis 104. The liquid can be transferred while the disc 800 is either at rest or rotating at high speed. The disc 800 can also contain several microfluidic circuits that are fed with necessary reagent liquids from the same chamber 801, as illustrated in FIG. 23A. The disc 800 is placed on a rotor inside a platform with a stationary waste reservoir, such as ring 400, collecting the liquid from the rotating disc (FIG. 23B). The waste ring can also contain absorbent material 404 and/or other structures as described elsewhere herein. In another exemplary embodiment, the centrifugal platform can be a pneumatically actuated microfluidic platform.

Any of numerous types of pumps can be used in the numerous embodiments herein, including, but not limited to, piezoelectric pumping.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

That which is claimed is:

1. A system for delivering liquid to a microfluidic chip, the system comprising:

a centrifugal microfluidic platform including a rotor configured to receive at least one microfluidic chip on a top surface of said rotor; and a stationary liquid pumping system positioned adjacent to said centrifugal microfluidic platform, said liquid pumping system comprising at least one stationary nozzle positioned above said top surface for dripping liquid into said at least one microfluidic chip mounted on said top surface, without any physical contact or coupling between said at least one nozzle and said at least one microfluidic chip, the centrifugal microfluidic platform comprising an articulated centrifugal platform.

2. A system according to claim 1, wherein said centrifugal microfluidic platform comprises a powered centrifugal platform.

3. A system according to claim 1, wherein said liquid pumping system comprises: a peristaltic pump; a pneumatic pump; a syringe pump; or a piezoelectric pump.

4. A combination comprising the system according to claim 1;

a microfluidic chip configured to be received by the rotor, the microfluidic chip comprising a loading chamber formed in the chip body, a loading port formed in the top of the loading chamber which exposes the loading chamber to the exterior of the chip body; and at least one fluidic channel formed in the chip body in fluid communication between the loading chamber and the exterior of the chip body; and a stationary waste collector having a cavity, the waste collector positioned away and separated from the microfluidic chip;

wherein the platform comprises a chip holder for retaining said microfluidic chip.

5. A combination according to claim 4, wherein the loading port has a diameter of at least D+2E, where D is the diameter of a liquid drop to be loaded into said loading chamber and E is the imprecision in angular positioning of a microfluidic platform upon which said microfluidic chip is to be positioned.

6. A combination according to claim 4, wherein the loading chamber has a floor coated with a hydrophilic material to enable droplet spreading, said material comprising a nanostructured material is embossed on the floor of the loading chamber.

7. A combination according to claim 6, wherein said hydrophilic material comprises a sheet of absorbent paper or an absorbent membrane.

8. A according to claim 4, wherein said chip body is rectangular.

9. A combination according to claim 4, wherein the microfluidic chip further comprises a metering channel formed in said chip body fluidly connecting said loading chamber to the exterior of said chip body, said metering channel adapted to meter precise amounts of liquids before transferring out of said loading chamber.

10. A combination according to claim 4, wherein the microfluidic chip further comprisescomprising:

a reaction chamber formed in said chip body;

a fluid channel formed in said chip body directly fluidly connecting said loading chamber to said reaction chamber; and an exit channel formed in said chip body directly fluidly connecting said reaction chamber to the exterior of said chip body.

11. A combination according to claim 4, wherein the microfluidic chip further comprises an exit channel formed in said chip body directly fluidly connecting said loading chamber to the exterior of said chip body.

12. A combination according to claim 4, wherein said microfluidic chip is positioned on the chip holder such that the at least one fluidic channel opens toward the waste collector.

13. A combination according to claim 4, wherein said microfluidic chip has channel openings on an edge thereof adjacent to said waste collector only such that, in a first orientation, liquid in said microfluidic chip is indefinitely retained in the microfluidic chip, and in a second orientation, liquid in said microfluidic chip can exit the microfluidic chip towards said waste collector.

14. A combination according to claim 4, further comprising a liquid absorbent material in said waste collector, the absorbent material is: paper based; fabric based; or a porous polymer.

15. A combination according to claim 4, wherein said waste collector comprises a 3D design which inhibits liquid from exiting the waste collector.

16. A method of delivering liquid to two or more ports on one or more microfluidic chips mounted to an articulated centrifugal microfluidic platform with two degrees of freedom, the method comprising:

while retaining said chip on a top surface of a rotor of said platform, rotating said platform about a primary axis thereof, and rotating at least one chip about a secondary axis thereof, the secondary axis offset from said primary axis, until at least one first loading port is respectively aligned with at least one stationary liquid dispensing nozzle of a liquid pumping system;

operating the liquid pumping system to dispense respective liquids to the first loading port or ports without any physical contact or coupling between said at least one nozzle and said chip;

rotating said platform about the primary axis, and said at least one chip about said secondary axis to change an orientation of said chip until a second loading port is aligned with at least one second loading port is respectively aligned with the at least one stationary liquid dispensing nozzle of said system; and operating the liquid pumping system to dispense respective liquids to the second loading port or ports without any physical contact or coupling between said at least one nozzle and said chip.

* * * * *